(12) United States Patent
Ivanov

(10) Patent No.: US 9,830,154 B2
(45) Date of Patent: Nov. 28, 2017

(54) METHOD, APPARATUS AND SYSTEM FOR DATA STREAM PROCESSING WITH A PROGRAMMABLE ACCELERATOR

(75) Inventor: Vladimir Ivanov, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 516 days.

(21) Appl. No.: 13/993,826

(22) PCT Filed: Dec. 29, 2011

(86) PCT No.: PCT/RU2011/001050
§ 371 (c)(1),
(2), (4) Date: Aug. 29, 2014

(87) PCT Pub. No.: WO2013/100784
PCT Pub. Date: Jul. 4, 2013

(65) Prior Publication Data
US 2014/0365748 A1 Dec. 11, 2014

(51) Int. Cl.
*G06F 9/30* (2006.01)
*G06F 9/38* (2006.01)
*G06F 15/78* (2006.01)
*G06F 9/445* (2006.01)

(52) U.S. Cl.
CPC ........... *G06F 9/30145* (2013.01); *G06F 8/65* (2013.01); *G06F 9/30003* (2013.01); *G06F 9/3881* (2013.01); *G06F 15/7889* (2013.01)

(58) Field of Classification Search
CPC .. G06F 9/3877; G06F 9/3881; G06F 15/7871; G06F 15/7889
See application file for complete search history.

(56) References Cited

U.S. PATENT DOCUMENTS

2006/0107027 A1* 5/2006 Chen ................... G06F 15/7867
712/221
2009/0183161 A1* 7/2009 Kolinummi ........... G06F 9/3012
718/102

OTHER PUBLICATIONS

Mattan Erez et al., "Stream Processors", Chapter 8 in the book W. Keckler et al. (eds.), Multicore Processors and Systems, Integrated Circuits and Systems, DOI 10.1007/978-1-4419-0263-4_8, C_Springer Science+Business Media, LLC 2009, pp. 231-270.

* cited by examiner

*Primary Examiner* — Benjamin Geib
(74) *Attorney, Agent, or Firm* — Nicholson De Vos Webster & Elliott LLP

(57) ABSTRACT

Techniques and mechanisms for programming an accelerator device to enable performance of a data processing algorithm. In an embodiment, an accelerator of a computer platform is programmed based on programming information received from a host processor of the computer platform. In another embodiment, programming of the accelerator is to enable data driven execution of an instruction by a data stream processing engine of the accelerator.

17 Claims, 18 Drawing Sheets

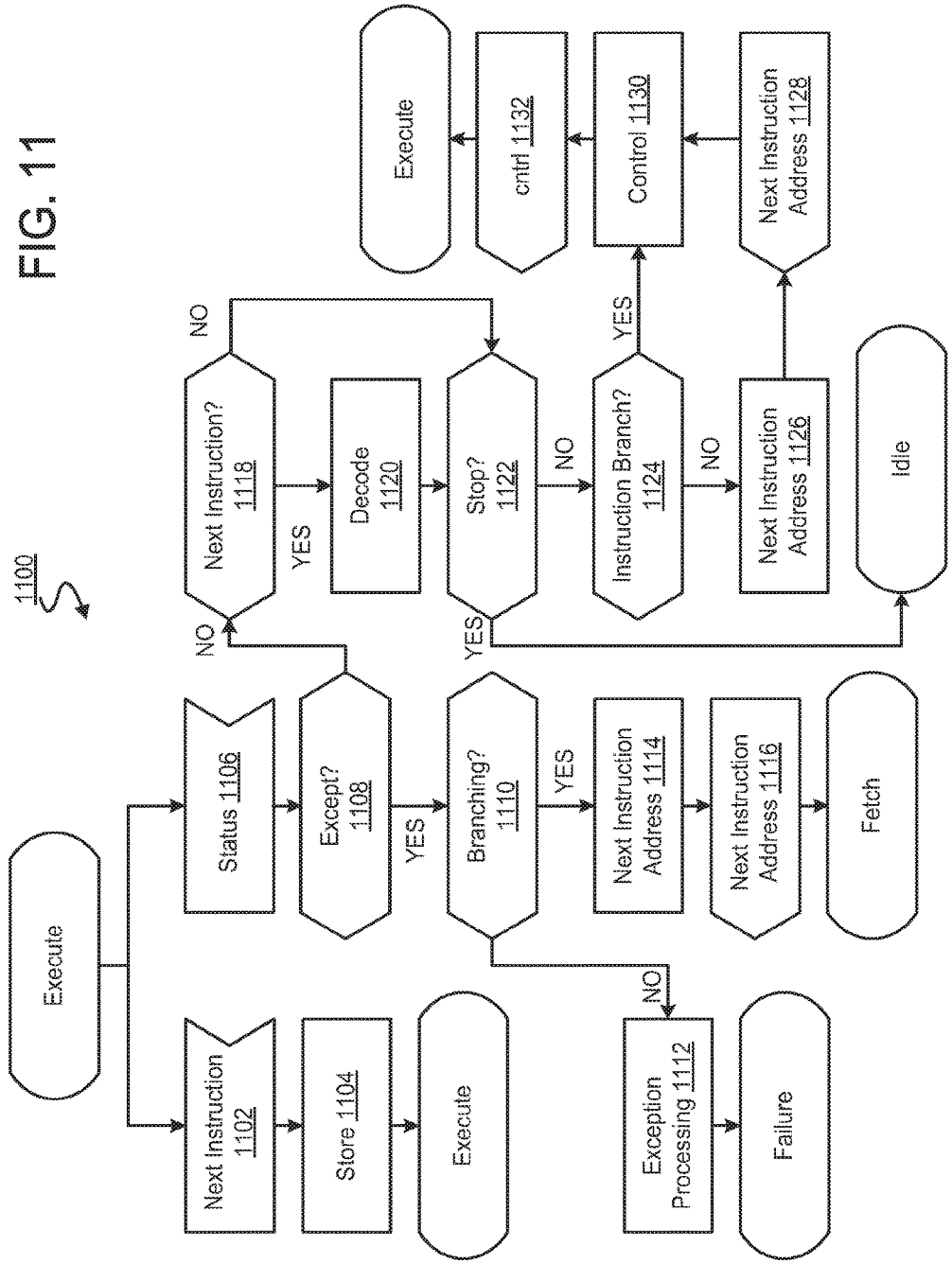

METHOD, APPARATUS AND SYSTEM FOR DATA STREAM PROCESSING WITH A PROGRAMMABLE ACCELERATOR

CROSS-REFERENCE TO RELATED APPLICATIONS

This patent application is a U.S. National Phase Application under 35 U.S.C. §371 of International Application No. PCT/RU2011/001050, filed Dec. 29, 2011, entitled METHOD, APPARATUS AND SYSTEM FOR DATA STREAM PROCESSING WITH A PROGRAMMABLE ACCELERATOR.

BACKGROUND OF THE INVENTION

1. Field of the Invention

Embodiments generally relate to operation of an accelerator in a computer platform. More particularly, certain embodiments relate to programming an accelerator to enable implementation of a data processing algorithm.

2. Background Art

Conventional computer systems frequently include some accelerator device which is provided to free a host processor from having to frequently perform some calculation-intensive data processing task. Existing accelerators are not programmable—e.g. reprogrammable—devices. More particularly, current accelerator devices variously provide some fixed functionality, or set of functionalities, which is programmed prior to incorporation of the accelerator device into a computer platform.

Typically, such functionality relies upon fine-grain control from a controller element of the accelerator itself. By virtue of their data path design and control design, a considerable amount of existing accelerators' processing resources are used for scheduling and issuing fine-grain, word-level instructions to be executed by homogeneous data path elements of the accelerator. As a result, accelerator performance is often subject to significant processing overhead.

As processing speeds increase, and as smaller form factor platforms are expected to support increasingly large processing loads, the limits of current accelerator design will have an increasing effect on platform performance.

BRIEF DESCRIPTION OF THE DRAWINGS

The various embodiments of the present invention are illustrated by way of example, and not by way of limitation, in the figures of the accompanying drawings and in which:

FIG. 11 is a flow diagram showing elements of a state transition for an instruction sequencer of a data stream processing engine according to an embodiment.

DETAILED DESCRIPTION

Figure 1:
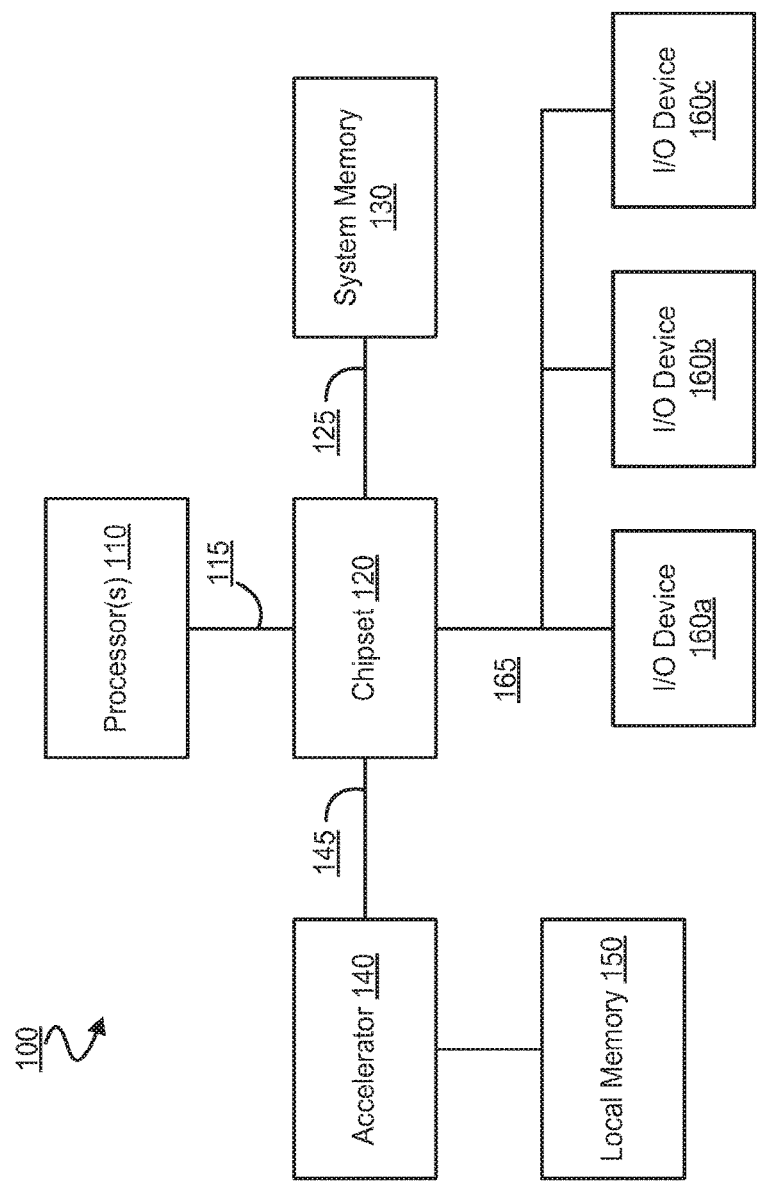
FIG. 1 is a block diagram showing elements of a computer platform for performing a data processing task according to an embodiment.

Different embodiments discussed herein variously provide mechanisms and techniques for an accelerator to execute an instruction to perform multiple atomic operations on data. The accelerator may, for example, include one or more data stream processing engines (DSPEs) each to implement a respective instruction execution for accomplishing a data processing task.

As used herein in the context of data processing by a DSPE, "operation" refers to the performance of a single atomic function (e.g. one of an add, subtract, multiply, divide, shift, negation, less than, greater than, equal to, AND, OR etc.) on at least one operand—e.g. a value stored in a byte, word, long word, etc. Furthermore, as used herein in the context of data processing by a DSPE, "instruction" refers to a command for a round of data processing to be performed by a data path—e.g. where a reading of data into the data path starts the round and where a writing of data from the data path ends the round. An instruction may cause a round of data processing which, for example, includes the data path performing multiple operations on data. Further still, as used herein in the context of data processing by a DSPE, "task" refers to the performance of a set of one or more instructions to be executed by one or more DSPEs—e.g. where a determination is made at the end of a task instruction as to whether another instruction of the task remains to be performed.

Certain embodiments variously provide for data driven execution of an instruction in a data path. As used herein, "data driven" refers to instruction execution in which each of one or more operations in a round of data processing—e.g. all operations in the round—are triggered, in one or more aspects, in response to some detecting of a presence of data to be processed. By way of illustration and not limitation, data driven execution may be triggered by a signal indicating that data has been written to a particular storage location from which such data may be read into the data path. For example, a microcontroller (mC) of an accelerator may be provide instruction information, instruction sequence information and/or the like for programming to enable a data path module to form the data path in question. However, one or more agents of the accelerator—e.g. other than the mC—may exchange signals for the DSPE to detect data presence which finally triggers the DSPE to begin processing a particular set of data with the formed data path. Accordingly, data driven execution may allow the mC of an accelerator to forego implementing circuit logic or software for the mC to directly participate in an exchange of data to be processed in the data path, and/or to directly participate in the scheduling of such a data exchange.

Various embodiments provide for an accelerator having resources which are specialized, in one or more respects, for a particular algorithm class (or "algorithm type"). By way of illustration and not limitation, a PA may include hardware which is specialized to implement an algorithm of an algorithmic class—e.g. for one of a variety of applications including, but not limited to video data processing, voice data processing, data encryption/decryption, data compression/decompression algorithm and/or the like.

Embodiments variously provide an accelerator which, for example, enables offloading one or more processing tasks from a CPU of a computer platform onto a more task-efficient device of the platform. Such an accelerator may operate—e.g. in an embedded or mobile platform—to execute computationally intensive tasks on large volumes of data.

In an embodiment, an accelerator includes a data stream processing engine having data path units to variously implement paths for multi-operation instructions—e.g. to form data path loops, etc.—which do not require fine grain control from a microcontroller of the accelerator and/or from a control unit of the data stream processing engine. An accelerator may—e.g. in lieu of cache memory—include a two-stage memory hierarchy including the local memory and one or more private memories of respective data stream processing engines. In an embodiment, functionality of an accelerator provides for deep and wide sets of data paths for instruction execution.

In certain embodiments, a control unit of an accelerator provides various instruction flow functionality—e.g. where the control unit may control execution of some current instruction, detect an end of execution of that instruction, calculate an address for some next instruction in an instruction sequence and/or perform various exception processing resulting from instruction execution.

FIG. 1 illustrates elements of a computer platform 100 for implementing data processing according an embodiment. Computer platform 100 may, for example, include a hardware platform of a personal computer such as a desktop computer, laptop computer, a handheld computer—e.g. a tablet, palmtop, cell phone, media player, and/or the like—and/or other such computer system. Alternatively or in addition, computer platform 100 may provide for operation as a server, workstation, or other such computer system.

Computer platform 100 may include an accelerator 140 to exchange and process data with one or more other components of computer platform 100. In an embodiment, computer platform 100 includes a one or more processors 110 and/or one or more data storage devices variously coupled to accelerator 140. By way of illustration and not limitation, accelerator 140 may be coupled via a chipset 120 to a system memory unit 130, a local memory unit 150 and/or various I/O devices, represented by illustrative I/O devices 160a, 160b, 160c. For example, I/O devices 160a, 160b, 160c may include one or more of a display device, a mouse, a keyboard, touchpad, touchscreen, speaker, microphone, digital camera, printer and/or the like.

For the purposes of the present specification, the term "processor" or "CPU" refers to any of a variety of data processing machines including, but not be limited to, general purpose microprocessors, special purpose microprocessors, multi-media controllers and microcontrollers, etc. In one embodiment, one or more processors 110 may include a general-purpose microprocessor that is capable of executing functionality such as that of an Intel Architecture instruction set. Chipset 120 may couple to processor 110 and to memory unit 130—e.g. via a host bus 115 and a memory bus 125, respectively. Alternatively or in addition, accelerator 140 may be coupled to the chipset 120 via a bus 145, although certain embodiments are not limited in this regard. For example, in alternate embodiment, accelerator 140 may be a component of chipset 120. In one embodiment, chipset 120 may include functionality of an Intel chipset. The teachings of the present invention, however, are not limited to Intel products and/or architecture and are applicable to any of a variety of other suitable products and/or architecture. In one embodiment, chipset 120 includes a memory control unit (not shown) that controls the interface between various system components and the system memory unit 130. One or more of I/O units 160a, 160b, 160c may, in one embodiment, variously couple to chipset 120—e.g. via an I/O bus 165 or PCI bus 165.

In an embodiment, an I/O device—e.g. one of I/O devices 160a, 160b, 160c—includes a network interface for connecting computer platform 100 to one or more networks (not shown)—e.g. including a dedicated storage area network (SAN), a local area network (LAN), a wide area network (WAN), a virtual LAN (VLAN), an Internet and/or the like. By way of illustration and not limitation, I/O device 160a may include one or more of wired or wireless modem, a network interface card (NIC), an antenna such as a dipole antenna, a wireless transceiver and/or the like, although certain embodiments not limited in this respect.

Figures 2A, 2B:
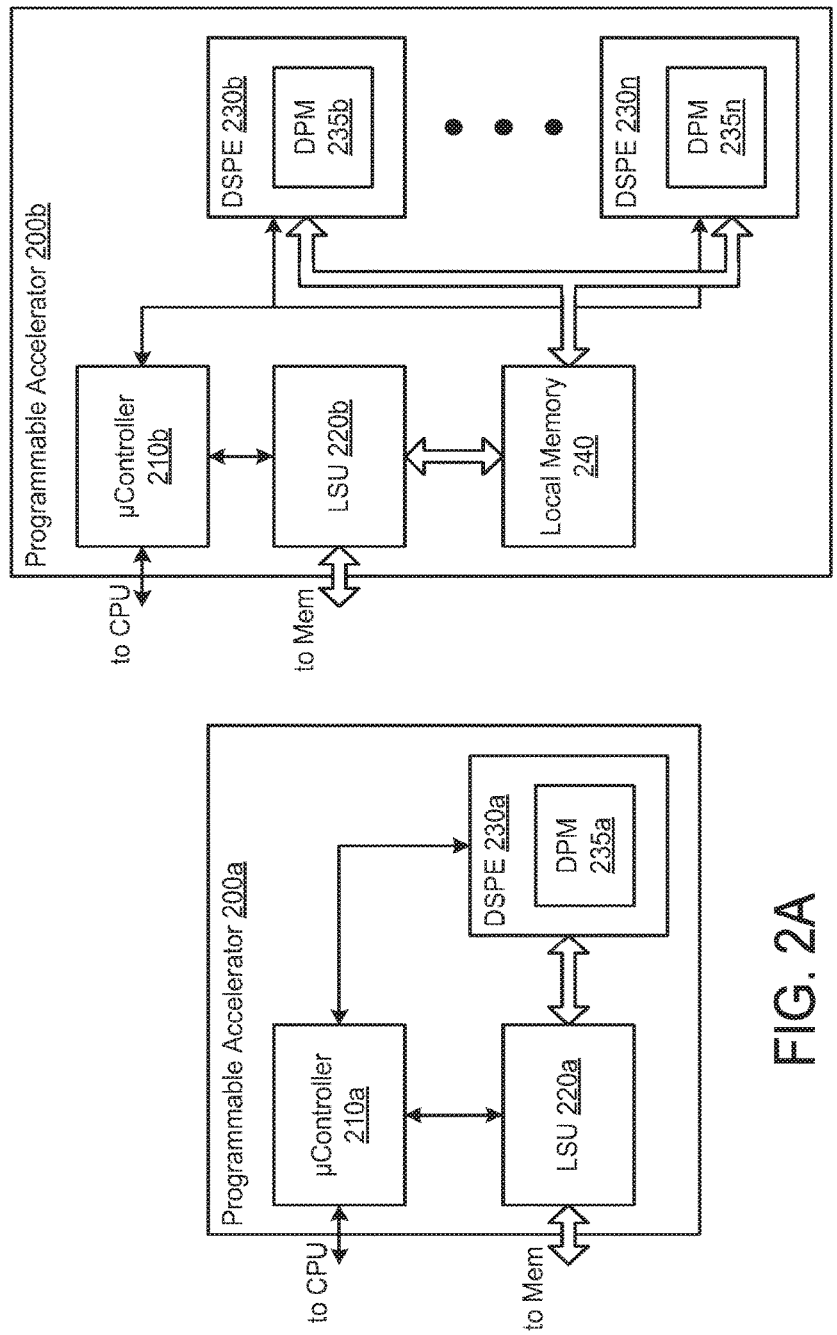
FIG. 2A is a block diagram showing elements of an accelerator which, according to an embodiment, is programmable for performing a data processing algorithm.
FIG. 2B is a block diagram showing elements of an accelerator which, according to an embodiment, is programmable for performing a data processing algorithm.

FIG. 2A illustrates elements of a programmable accelerator (PA) 200a according to an embodiment. PA 200a may operate in a computer platform having some or all of the functionality of system 100, for example. In an embodiment, PA 200a includes one or more the features of accelerator 140.

PA 200a may include hardware which provides a functional template for variously performing algorithms of a particular algorithm type. For example, PA 200a may include hardware which is specialized, in one or more respects, for performing a group of operations associated with algorithms of a particular algorithm type. By way of illustration and not limitation, PA 200a may include hardware which is dedicated to, or readily adaptable to, performing some operations corresponding to an algorithm type—e.g. one of a particular cryptographic algorithm type (e.g. encryption and/or decryption), a signal transform algorithm type (e.g. a Fourier transform, Z-transform, etc.), a Markov chain algorithm type, and/or the like. In an embodiment, PA 200a may be programmable at least insofar as it may download information for programming—e.g. reprogramming—to enable PA 200a to perform an additional and/or alternative algorithm of the algorithm type.

In an embodiment, PA 200a includes a microcontroller (mC) 210 to receive programming information sent to PA 200a—e.g. the programming information provided by a central processing unit or other processor (not shown) of a computer platform in which PA 200a operates. Based on such programming information, mC 210a may program—e.g. reprogram—one or more components of PA 200a to enable performance of a particular data processing algorithm. One or more internal components of PA 200a may, for example, include or otherwise utilize an interface which, for example, is Open Core Protocol (OCP) compliant.

By way of illustration and not limitation, PA 200a may include a data stream processing engine (DSPE) 230a coupled to mC 210a and a load store unit (LSU) 220a coupled to mC 210a and DSPE 230a. DSPE 230a may include circuit logic to variously implement execution of one or more data processing instructions—e.g. including an instruction to perform multiple atomic operations. An atomic operation may, for example, consist of a single arithmetic or other data manipulation—e.g. an operation to perform one of addition, subtraction, multiplication, division, shift, etc. LSU 220a may, for example, include circuit logic to exchange data to be operated on by DSPE 230a. In an embodiment, LSU 220a includes direct memory access (DMA) circuit logic for accessing a memory outside of PA 200a—e.g. a DRAM—although certain embodiments are not limited in this regard.

Programming of PA 200a may include mC 210a variously providing configuration information, instruction code, instruction sequence information and/or the like to DSPE 230a, LSU 220a and/or other such components of PA 200a. For example, programming of PA 200a by mC 210a may load a representation of a particular data processing algorithm into DSPE 230a. By way of illustration and not limitation, mC 210a may load instruction code and/or other instruction information which DSPE 230a may later reference for execution of a particular instruction—e.g. the execution to perform some or all of a data processing algorithm to operate on some set of data of a data processing task. The data processing algorithm may be one of a particular algorithm type—e.g. where an architecture of at least some circuit logic of PA 200a is specific, in one or more respects, to the algorithm type. In an embodiment, the loaded instruction information may allow DSPE 230a to execute an instruction which includes multiple atomic operations.

Additionally or alternatively, the programming of PA 200 may include mC 210a providing configuration information to enable LSU 220a to perform data loading in support of data processing by DSPE 230a. Such configuration information may, for example, define how LSU 220a is to perform some subsequent data load operations which are suited for DSPE 230a performing data processing according to the programmed algorithm. By way of illustration and not limitation, LSU 220a may be configured to buffer data, reorder data, separate data for parallel processing (for example, tagging or otherwise designating data for certain ports, data paths, streams, substreams and/or the like), verify a format of data, verify a sufficiency of an amount of data and/or perform other such operations to properly present data for processing according to the programmed algorithm.

After programming by mC 210a, PA 200a may receive—e.g. from a CPU of the computer platform—a task for processing a set of data. In response to PA 200a being assigned such a task, mC 210a may exchange various communications with one or more other components of PA 200a to service the data processing task.

For example, mC 210a may send a descriptor of the task to DSPE 230a. Based on such signaling, DSPE 230a may determine a first instruction of the task for execution—e.g. by accessing instruction sequence information previously provided by mC 210a. Instruction sequence information may, for example, describe a sequence of instructions to perform a data processing task or, alternatively, identify that only a single instruction accomplishes the data processing task. After determining a first task instruction to perform, DSPE 230a may begin to perform its own internal programming—e.g. in preparation for data driven execution of the first instruction.

Additionally or alternatively, mC 210a may, in response to receiving the assigned task, signal LSU 220a to perform one or more loading operations to make data available to DSPE 230a. In response, LSU 220a may exchange data from a memory (not shown) coupled to PA 200a to some other memory within PA 200a which is accessible to DSPE 230a—e.g. to a private memory within DSPE 230a.

Processing of the exchanged data may, for example, include DSPE 230a detecting that LSU 220a has accomplished a loading to such a memory of at least part of the data to be processed. In an embodiment, processing of the task data by DSPE 230a may be data driven—e.g. at least insofar as a detection of such loading LSU 220a may trigger DSPE 230a to begin one or more data processing operations. For example, such triggering may be independent of mC 210a explicitly specifying to DSPE 230a that a particular instruction is to be performed and/or when such an instruction is to be performed.

DSPE 230a may process such data according to a programming of DSPE 230a by mC 210a. By way of illustration and not limitation, DSPE 230a may include a data path module 235a having one or more data processing units for variously performing respective data operations. In an embodiment, data path module 235a may be variously programmed to form different data paths for processing data. Instruction information received by DSPE 230a may describe or otherwise indicating a data path to be formed for executing an instruction.

Data path module 235 may include circuit logic which, in one or more respects, is specialized in structure for implementing functionality associated with a particular algorithmic class. Such specialized structure may, in an embodiment, be configured—e.g. reconfigured—to variously implement different variations of a functionality associated with the algorithm type.

In an embodiment, programming PA 200a to enable performance of a first algorithm may be independent of, e.g. prior to, PA 200a being provided with information indicating that a particular task is to be performed according to such programming. For example, programming PA 200a for performance of a first algorithm may be performed once—e.g. where multiple data processing tasks are subsequently assigned for PA 200a to perform according to the algorithm.

In an embodiment, PA 200a may be reprogrammed from supporting a first algorithm to supporting a second algorithm of the same algorithm type. For example, mC 210a may receive second programming information and in response, disseminate one or more configuration information, instruction code, instruction sequence information, etc.

FIG. 2B illustrates elements of a programmable accelerator (PA) 200b for executing a data processing instruction according to an embodiment. PA 200b may include one or more features of accelerator 140, for example.

PA 200b may provide an extension of functionality provided by PA 200a. For example, PA 200b may include a mC 210b coupled to a LSU 220b and multiple DSPEs, represented by an illustrative DSPE 230b, . . . , DSPE 230n. In an embodiment, functionality of mC 210b and functionality of LSU 200b may correspond, respectively, to functionality of mC 210a and functionality of LSU 200a. DSPE 230b, . . . , DSPE 230n may each variously provide some or all of the functionality of DSPE 230a.

In an embodiment, PA 200b further includes a local memory 240 coupled between LSU 220b and each of DSPE 230b, . . . , DSPE 230n. Operation of LSU 220b may vary from that of LSU 220a at least insofar as LSU 220b, rather than directly loading data into a private memory of a DSPE, may load such data to local memory 240, which is shared by DSPE 230b, . . . , DSPE 230n. In an embodiment, loading of data into local memory 240 may variously trigger one or more of DSPE 230b, . . . , DSPE 230n to each begin a data driven execution of a respective task instruction.

In an embodiment, some or all of DSPE 230b, . . . , DSPE 230n are, in one or more respects, heterogeneous with respect to one another. By way of illustration and not limitation, various ones of DSPE 230b, . . . , DSPE 230n may each include different respective hardware architectures—e.g. where different DSPEs are specialized for implementing different respective aspects of a data processing algorithm. Additionally or alternatively, various ones of DSPE 230b, . . . , DSPE 230n may be programmed at some particular time to generate different data path sets for execution of different corresponding instructions. Similarly, LSU 220b may, in an embodiment, be configured to perform different data loading operations—e.g. data buffering, storing, reordering, separating, tagging, verifying, etc.—for loading different data to various respective ones of DSPE 230b, . . . , DSPE 230n via local memory 240.

Figure 3:
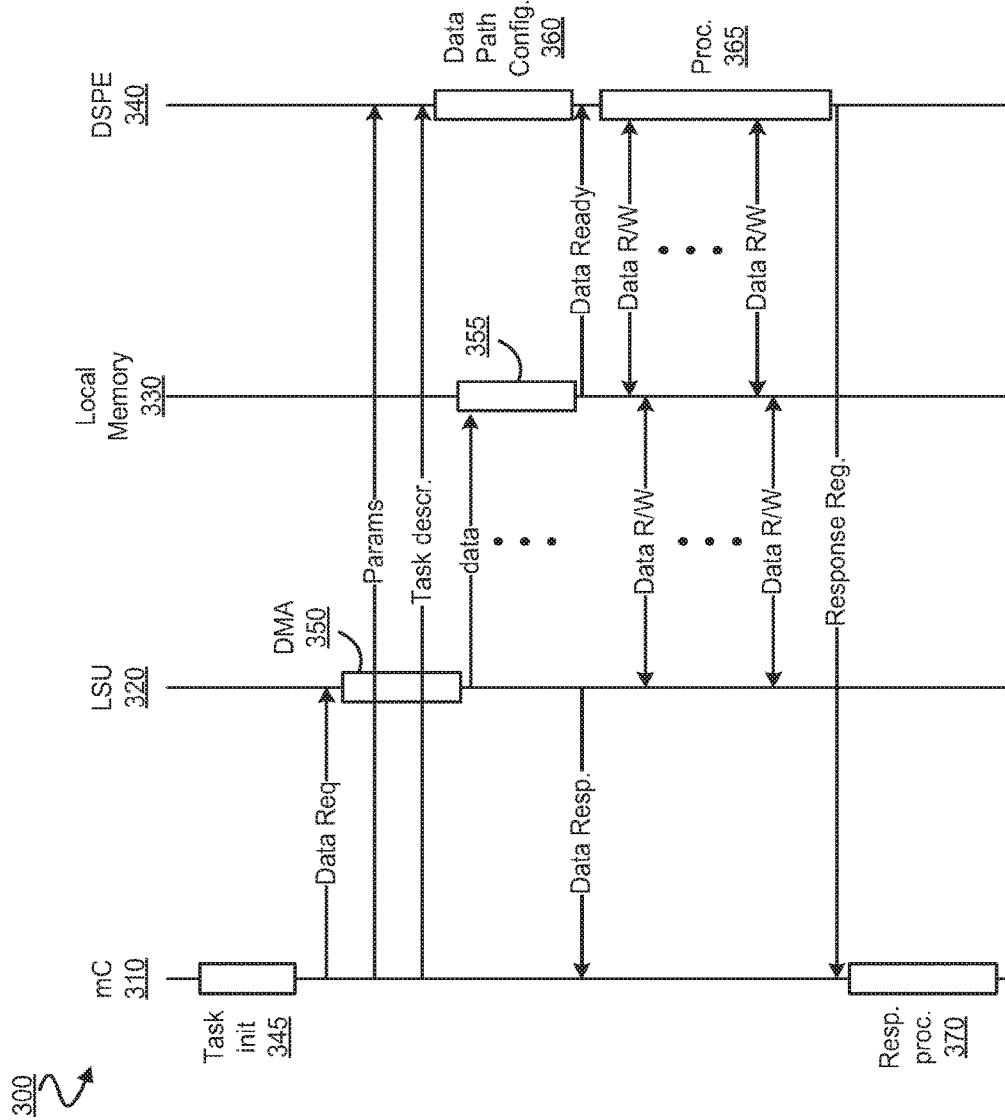
FIG. 3 is a sequence diagram showing elements of a signal exchange in a programmable accelerator according to an embodiment.

FIG. 3 illustrates elements of a signal exchange 300 for performing data processing in an accelerator according to an embodiment. Signal exchange 300 may be performed in a programmable accelerator having some or all of the features of PA 200a (and/or PA 200b), for example. For instance, the various functionality of mC 310, LSU 320, local memory 330 and DSPE 340 may correspond, respectively, to the various functionality of mC 210b, LSU 220b, local memory 240 and one of DSPE 230b, . . . , 230n.

Signal exchange 300 may be performed in response to a host CPU sending to the PA a message indicating a data processing task which is to be performed by the PA. Such a message may be received, for example, after the accelerator implementing signal exchange 300 has been programmed to support a particular data processing algorithm. In response to such the message, mC 310 may perform one or more operations—e.g. during a "Task init" stage 345—to prepare a task descriptor and/or one or more task parameters to characterize or otherwise identify the task.

After completing the "Task init" stage 345, mC 310 may send to LSU 320 one or more signals, such as an illustrative data request signal, to trigger LSU 320 to perform load operations to provide data to a memory—e.g. memory 330. The one or more signals from mC 310 may, for example, initiate a DMA stage 350 in which LSU 320 performs one or more DMA operations to retrieve from some external platform memory—e.g. a dynamic random access memory (DRAM) or other suitable storage device—data to be processed by DSPE 340 for performance of the task. In an embodiment, LSU 320 includes one or more buffers and/or control logic to buffer, reorder, separate, tag, verify and/or otherwise prepare data for processing by DSPE 340. LSU 320 may load such prepared data to local memory 330, for example. In an alternate embodiment, LSU 320 may perform operations to load data directly into a private memory within DSPE 340—e.g. where the accelerator does not include a local memory which is external to, and shared by, multiple DSPEs of the accelerator.

After completing the "Task init" stage 345, mC 310 may also signal DSPE 340 to prepare for performing, according to the programmed algorithm, at least part of the data processing task. For example, mC 310 may send a task descriptor and/or one or more task parameters to DSPE 340. In an embodiment, the task descriptor and any parameters provided by mC 310 may be loaded, respectively, into a task register and a register file of DSPE 340.

The provided task descriptor and any parameters may trigger DSPE 340 to start preparing for execution of the task. For example, the condition of a non-empty task register may transition DSPE 340 from an "Idle" state and to an "Init" state. In such an Init state, DSPE 340 may decode the task descriptor and, for example, determine a first instruction to be performed for the task. In response to identifying the first instruction, DSPE 340 may perform a data path configuration process 360 to form in DSPE 340 a set of one or more data paths (a "data path set") for multiple atomic operations of the first instructions.

DSPE 340 may detect a completion or other sufficient state of progress of the DMA stage 350—e.g. based on a "Data ready" control signal generated in response to at least part of the task data being loaded to local memory 330 (or, alternately, to a private memory of DSPE 340). Detecting that such data is ready may trigger DSPE 340 to enter a "Processing" state 365 to begin at least one data read from local memory 330 and, in an embodiment, one or more writes of processed data to local memory 330. Processed data written back to local memory 330 may, in an embodiment, be written in turn back to LSU 320, although certain embodiments are not limited in this regard. DSPE 340 may stop the task when no data remains for processing, when a failure occurs and/or the like.

Upon task completion, DSPE 340 may move back to an "Idle" state—e.g. after sending to mC 310 some indication of an outcome of the executed instruction. For example, a response register of DSPE 340 may receive some outcome of the data processing, which automatically triggers DSPE 340 send a response descriptor message. The response descriptor message may operate as an interrupt for mC 310 to handle—e.g. where mC 310 reads and processes the response descriptor, at 370, to finish task execution.

Figure 4:
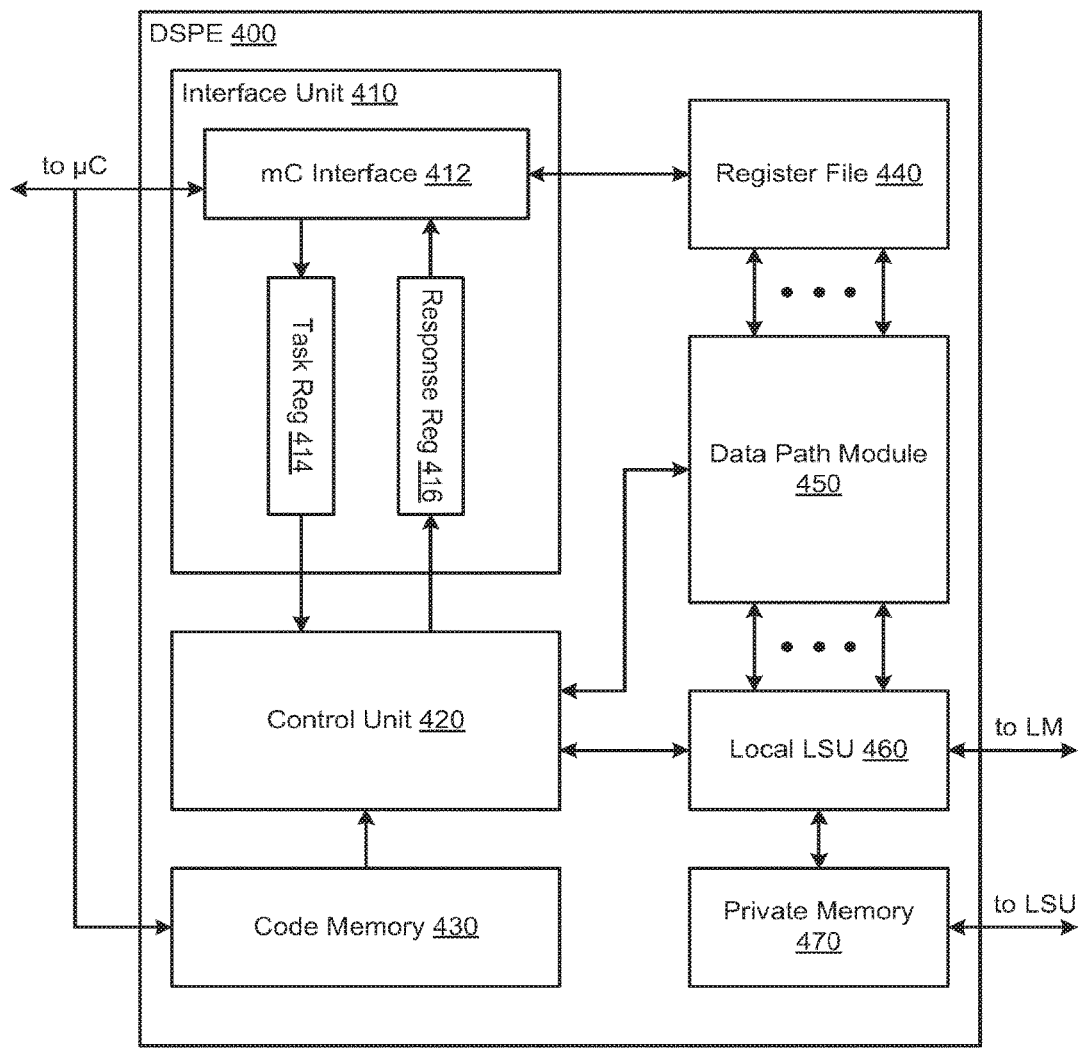
FIG. 4 is a block diagram showing elements of a data stream processing engine for executing an instruction of a data processing task according to an embodiment.

FIG. 4 illustrates elements of a DSPE 400 for operation in an accelerator according to an embodiment. DSPE 400 may include some or all of the features discussed with respect to DSPE 230a and/or DSPE 230b, . . . , DSPE 230n, for example.

In an embodiment, DSPE 400 includes its own memory subsystem—e.g. to operate with a larger memory system of the accelerator which includes DSPE 400. For example, DSPE 400 may include a private memory (PM) 470 and/or a local LSU (LLSU) 460. Access to PM 470 may be provided through LLSU 460—e.g. where LLSU 460 includes parallelization hardware to ensure multi-port access to data in PM 470. In the case of DSPE 400 operating as a sole DSPE of an accelerator, data to be processed by DPM 450 may be fed to PM 470 from an LSU external to DSPE 400. In case of DSPE 400 operating as one of multiple DSPEs of an accelerator, a more extensive memory hierarchy may be used. LLSU 460 may, for example, direct data flow to PM 470 and/or bring portions of data from the accelerator's own local memory directly to data processing circuit logic of DSPE 400—e.g. a data path module (DPM) 450.

In an embodiment, DSPE 400 includes circuit logic to exchange any of a variety of types of information with a mC of the PA in which DSPE 400 operates—e.g. one of mC 210a, mC 210b. The mC may, for example, program DSPE 400 with functionality to perform a data processing algorithm. Alternatively or in addition, the mC may provide signals to cause DSPE 400 to perform at least part of a task to process data according to such an algorithm.

For example, the mC may provide DSPE 400 with programming information including a representation (image) of an executable data processing algorithm. In an embodiment, DSPE 400 includes a code memory (CM) 430 to store such a received algorithm image. The algorithm image may, for example, include a description of a sequence of executable instructions which comprise the algorithm. Alternatively or in addition, the algorithm image may include information describing some or all of the one or more instructions which comprise such an algorithm. By way of illustration and not limitation, the algorithm image may include a binary representation of a data path with which a particular instruction is to be executed. The binary representation may, for example, include a bit field (e.g. flag field) or other similar data structure to represent a set of configuration values for forming such a data path.

For example, DSPE 400 may include and a DPM 450 and a control unit (CU) 420 including circuit logic to control the formation in DPM 450 of a set of one or more data paths for execution of a particular task instruction. In an embodiment, DPM 450 provides the main data processing functionality of DSPE 400—e.g. where the data operations for executing an instruction are performed in DPM 450. DPM 450 may receive control signals from CU 420 for forming a set of one or more data paths in DPM 450. With the data path set formed, DPM 450 may perform some data driven execution of an instruction corresponding to the formed data path set. Execution of such an instruction may, for example, include DPM 450 reading data from and/or writing data to a private memory 470 of DSPE 400. In certain embodiments, execution of the instruction may further include DPM 450 reading one or more parameters for a task—e.g. where IU 410 receives such parameters and writes them to a register file 440 for access by DPM 450.

In an embodiment, the mC may further provide DSPE 400 with information indicating a data processing task which DSPE 400 is to perform—e.g. a component task of a larger data processing task performed by multiple DSPEs of the accelerator which includes DSPE 400. For example, DSPE 400 may include an interface unit 410 to couple DSPE 400 to the computer platform's mC. Interface unit 410 may include a mC interface 412 having circuit logic to receive from the mC a task descriptor and/or one or more task parameters. Interface unit 410 may further include a task register (TR) 414 to receive and store a task descriptor received by mC interface 412. In an embodiment, storage of the task descriptor to TR 414 may automatically trigger one or more components of DSPE 400 to prepare for execution of a first instruction of the task which DSPE 400 is to perform.

Operation of CU 420 to form the data path set of DPM 450 may be triggered by a task descriptor being stored to TR 414, although certain embodiments are not limited in this regard. For example, CU 420 may detect and read a current task descriptor from TR 414 and decode the current task descriptor to identify an address of a first instruction for the task and/or information identifying an address and length of data to be processed by the task. Based on the decoding, CU 420 may fetch and decode an instruction from the code memory 430 and generate control signals to configure DPM 450 for data driven execution of the instruction. The instruction may be the first of an instruction sequence for the task—e.g. where CU 420 configures DPM 450 repeatedly, each configuring to form in DPM 450 a different data path set for a respective instruction of the instruction sequence.

In an embodiment, CU 420 may further collect feedback (status) information from data path module 450—e.g. the feedback generated as a result of instruction execution. Based on such feedback information, CU 420 may, for example, change a flow of an instruction sequence. For example, CU 420 may provide additional control signals for data path module 450 and/or a local LSU (LLSU) 460 to determine subsequent data loading and processing by DPM 450. Instruction execution may further result in the CU 420 receiving information representing a result of such execution. Based on such result information, CU 420 may provide a response descriptor to interface unit 410. For example, interface unit 410 may include a response register (RR) 416 to receive a response descriptor which is generated based on a task completion. Storage of a response descriptor to RR 416 may automatically trigger mC interface 412 to process the response—e.g. including communicating response information to the mC coupled to DSPE 400.

Figure 5:
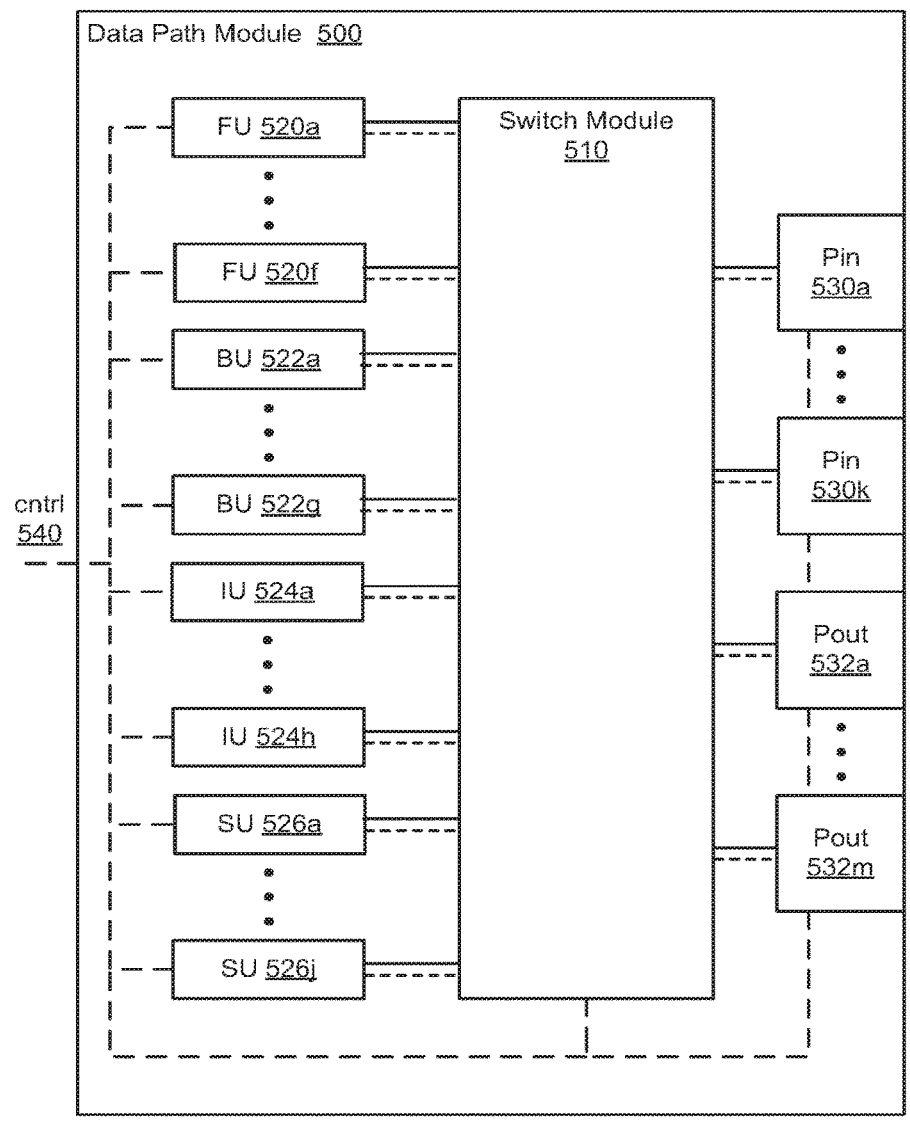
FIG. 5 is a block diagram showing elements of a data path module of a data stream processing engine according to an embodiment.

FIG. 5 illustrates elements of a data path module (DPM) 500 for implementing instruction execution according to an embodiment. DPM 500 may include circuit logic for operation in a data stream processing engine of an accelerator. For example, DMP 500 may include some or all of the features of DPM 450.

Data path module (DPM) 500 may include multiple elements referred to herein as data processing units (DPUs). A "data processing unit" refers to any element of a data path module including circuit logic to receive data as input and provide corresponding data as output, the receiving and providing to support execution of some data processing instruction. The multiple DPUs of DPM 500 may variously include signal lines—e.g. hardware interface structures for variously communicating data, address, control and/or configuration information. Such structures may, for example, include signal pins and/or signal pads, although certain embodiments are not limited in this regard.

For example, a given DPU may include one or more input data lines data_in to receive data and/or one or more output data lines data_out to send data. A DPU may, for example, have a total number of data_in[1:N] lines and the same total number of data_out[1:N] lines, although certain embodiments are not limited in this regard. Additionally or alternatively, a DPU may include one or more input valid signal lines valid_in to receive a control signal specifying whether certain data—e.g. data received via data_in[1:N]—is valid. In an embodiment, a DPU has a single bit control line valid_in[1]—e.g. where valid_in[1]=1 means input data is valid (or 0 if invalid). Additionally or alternatively, a DPU may include one or more output valid signal lines valid_out to send a control signal specifying whether certain data—e.g. data sent via data_out[1:N]—is valid. In an embodiment, a DPU has a single bit control line valid_out[1]—e.g. where valid_out[1]=1 means output data is valid (or 0 if invalid).

In an embodiment, a DPU includes one or more output ready signal lines ready_out for the DPU to send a control signal specifying or otherwise indicating a readiness of the DPU to perform some action in support of execution of an instruction. Additionally or alternatively, a given DPU may include one or more input ready signal lines ready_in for the DPU to receive from some other DPU a control signal specifying or otherwise indicating a readiness of that other DPU to perform some action in support of execution of an instruction. Such readiness to perform an action may, for example, include a readiness of a given DPU to perform an operation on data which is received, or is to be received—e.g. via the data_in[1:N] of that given DPU. Alternatively or in addition, such readiness to perform an action may, for example, include readiness of a given DPU to send a result of an operation on data via the data_out[1:N] to the given DPU. In an embodiment, a DPU has a single bit control line ready_out[1]—e.g. where ready_out[1]=1 means the DPU is ready for performing some action (or 0 if not ready). Similarly, a DPU may have a single bit control line ready_in[1]—e.g. where ready_in[1]=1 means some other DPU is ready for performing some action (or 0 if not ready).

In an embodiment, a DPU includes one or more configuration lines cfg with which the DPU receives configuration signals—e.g. from a control module of the DSPE in which DPM 500 is to operate. For example, the DPU may receive a plurality of bit values—e.g. in series in a cfg[1] or in pallel in a cfg[1:M] input—which program one or more aspects of DPU operation. Information sent in a cfg communication may, for example, program one or more of an atomic data operation to be performed, a triggering time to perform some operation (e.g. single cycle, multi-cycle, etc.), a delay before providing output data, a protocol for exchanging one or more control signals, a test condition and/or any of a variety of additional or alternative characteristics of DPU operation. Additionally or alternatively, a DPU may include one or more reset lines rst to receive an input signal to return the DPU to some default configuration state—e.g. an "Init" state.

A DPU may additionally or alternatively include one or more clock lines—e.g. clk[1]—to receive a clock signal for synchronizing operations in DPM 500. Moreover, a DPU may additionally or alternatively include one or more enable lines—e.g. enbl[1]—with which the DPU may be selectively turned on or off. Alternatively or in addition, a DPU may include one or more status lines status for the DPU to variously output a control signal specifying some current state of the DPU—e.g. whether or not the DPU is in an Exception state or some operational state (such as an Idle state or a Busy state). A configuration cfg of a DPU may be distinguished from, e.g. persist through, different states of the DPU which might be variously represented by status.

The multiple DPUs of DPM 500 may include DPUs of various types. By way of illustration and not limitation, the DPUs of DPM 500 may include what is referred to herein as a functional unit (FU)—e.g. one of the illustrative FUs 520a, . . . , 520f of DPM 500.

A FU may include circuit logic to perform some atomic data operation—e.g. a single input or multiple input, and single output or multiple output, operation. Based on input data, a FU may generate output data in less than 1 clock cycle (e.g. in the case of a Boolean operation), or in one or more cycles. By way of illustration and not limitation, a FU of FUs 520a, . . . , 520f may be configured to output data after some defined period of time—e.g. L clock cycles after receiving input data on which the output data is based. Alternatively or in addition, a FU of FUs 520a, . . . , 520f may be configured to provide pipelined operation—e.g. where initial output data is to be delivered after some initial delay, and thereafter subsequent output data will be delivered on each clock cycle. The number and variety of operations to be performed by FUs 520a, . . . , 520f may vary according to different implementations and design interests, and are not limiting on certain embodiments.

Over time, a FU may variously transfer between a set of states including, for example, one or more of an Idle state, a Busy state and a Failure state. In an Idle state, a FU may be ready to receive input data as an operand for an atomic data operation. By contrast, a FU in a Busy state may be in the process of performing such an operation on input data. A Failure state of a FU may include the FU having been unsuccessful in performing a data operation. In an embodiment, data output by an FU may be a function of a current configuration of the FU, a current state of the FU and/or input data provided to the FU. Performance of a data operation by an FU may, for example, cause the FU to change state, even though the configuration which defines the FU's operation persists.

Additionally or alternatively, the DPUs of DPM 500 may include some interconnect unit (IU)—e.g. one of the illustrative IUs 524a, . . . , 524h of DPM 500. An IU may include circuit logic to selectively interconnect other DPUs—e.g. heterogeneous DPUs—to one another. An IU may, for example, include logic to implement one or more of the one of a multiplexer (MUX), a multiplexer with counter (cMUX), a demultiplexer (DMX), a demultiplexer with counter (cDMX) and a splitter (SPL). A MUX IU or a DMX IU may be a DPU which is configurable by a received cfg signal. A MUX IU and a DMX IU may be multi-input and multi-output, respectively. Counter functionality of an IU may, for example, provide a programmable counter to define an order in which an output signal is to multiplex input signals or, alternatively, an order in which output signals are to demultiplex an input signal. In an embodiment, an SPL IU simply copies an input data flow to multiple output data flows.

Additionally or alternatively, the DPUs of DPM 500 may include some branching unit (BU)—e.g. one of the illustrative BUs 522a, . . . , 522g of DPM 500. A BU may include circuit logic to selectively change a data flow in DPM 500. For example, a BU may operate, or be programmable to operate, as what is referred to herein as a ρ-node. A ρ-node may selectively copy different data received via an input of the ρ-node to respective ones of different output branches of the ρ-node—e.g. the copying based on the data itself. In an embodiment, a ρ-node may implement some triggering time L before providing output—e.g. to maintain some internal pipeline depth M of incoming data. An input reset control signal may, for example, cause a ρ-node to copy input data to a particular one of two output branches of the ρ-node. Subsequently, the ρ-node may—e.g. on a next clock cycle—copy the input data onto the other one of the two output branches.

Additionally or alternatively, a BU may operate, or be programmable to operate, as what is referred to herein as a φ-node. A φ-node may selectively copy different data received via respective inputs of the φ-node to an output branch of the φ-node—e.g. the copying based on the data itself. As with a ρ-node, a ϕ-node may implement some output triggering time L to maintain some internal pipeline depth M of incoming data. An input reset control signal may, for example, cause a ϕ-node to output data from a particular one of two input branches of the ϕ-node. Subsequently, the ϕ-node may—e.g. on a next clock cycle—output data from the other one of the two input branches.

Additionally or alternatively, the DPUs of DPM 500 may include some store unit (SU)—e.g. one of the illustrative SUs 526a, . . . , 526j of DPM 500. An SU may, for example, store an intermediate data in one or more internal registers—e.g. to implement a needed delay before a FU and/or after an FU operate on such intermediate data. During execution of an instruction, a SU may variously transition between different states in a set of operation states. By way of illustration and not limitation, the set of states may include one or more of an 'Init' state during which a delay period is not defined, an 'Empty' state during which space is available for storing input data and there is no output data to be provided, an 'Available' state during which space is available for storing input data and there is output data to be provided, an 'Full' state during which there is no space available for input data and a 'Failure' state during which there is some incorrect control of the SU.

An SU may, for example, perform various internal functions to support operation according to its configuration. By way of illustration and not limitation, a SU may variously perform one or more of a "store( )" function to store an input value into a delay line, a "clear( )" function to output data stored in the delay line, a "flush( )" function to simply remove data from the delay line, a "set(delay)" function to set a delay value and/or the like.

Additionally or alternatively, the DPUs of DPM 500 may include some ports—e.g. one of the illustrative input ports Pin 530a, . . . , Pin 530k of DPM 500 and/or the illustrative output ports 532a, . . . , 532m of DPM 500. A port DPU may include circuit logic to abstract memory accesses for DPM 500 to exchange data—e.g. with a private memory and/or a register file. In an embodiment, a port DPU operates, or may be configured to operate, as a synchronous port and/or an asynchronous port. A port DPU may, for example, exchange data stored in an addressable memory location and/or address information for identifying such an addressable memory location. In an embodiment, a port DPU may variously transition between different states—e.g. including one or more of an "Idle" state during which the port is available to begin a memory access, an "operate" state during which a memory access is performed, an "end of operation" (EoO) state after completion of a memory access, a "stall" state during which a target memory is not ready to support a memory access and/or the like. A stall state of a port DPU may, for example, be accompanied by the DPU providing a ready_out[1]=0 control signal.

DPM 500 may further include a switch module 510 to variously couple selective ones of the multiple DPUs to one another—e.g. to form a set of one or more data paths for executing an instruction. By way of illustration and not limitation, one or more control signals 540 may be provided to DPM 500 to variously configure different respective ones of the multiple DPUs and/or various one or more switch elements in switch module 510. Configuration of these various elements of DPM 500 may form data paths which, for example, are available for data driven execution of an instruction.

Such a set of one or more data paths may, for example, include at least a read port DPU configured to read input data into the data path set, a write port DPU configured to write a result from the data path set and some other DPUs to perform operations to generate the result based on the input data.

Switch module 510 may, for example, be what is referred to herein as a "scarce" switch module, at least insofar as it provides less than complete cross-bar switch functionality for switching among all DPUs coupled to switch module 510. By way of illustration and not limitation, DPM 500 may include some set of two or more DPUs which switch module 510 may only be able to indirectly couple to one another. In an embodiment, scarce switch functionality of switch module 510 is supplemented by, and avails of, other architecture of DPM 500 which provides a functional template for operations associated with a particular algorithm type. For example, DPM 500 may include one or more permanent interconnects (not shown), outside of switch module 510, which variously couple some DPUs directly and/or indirectly to one another. For example, some DPUs of DPM 500 may be directly coupled permanently to one another—e.g. independent of switch module 510. Such a set of permanently interconnected DPUs may provide a component set of one or more data paths which, according to different embodiments, may be configured and/or incorporated with other data paths for execution of an instruction.

Figure 6:
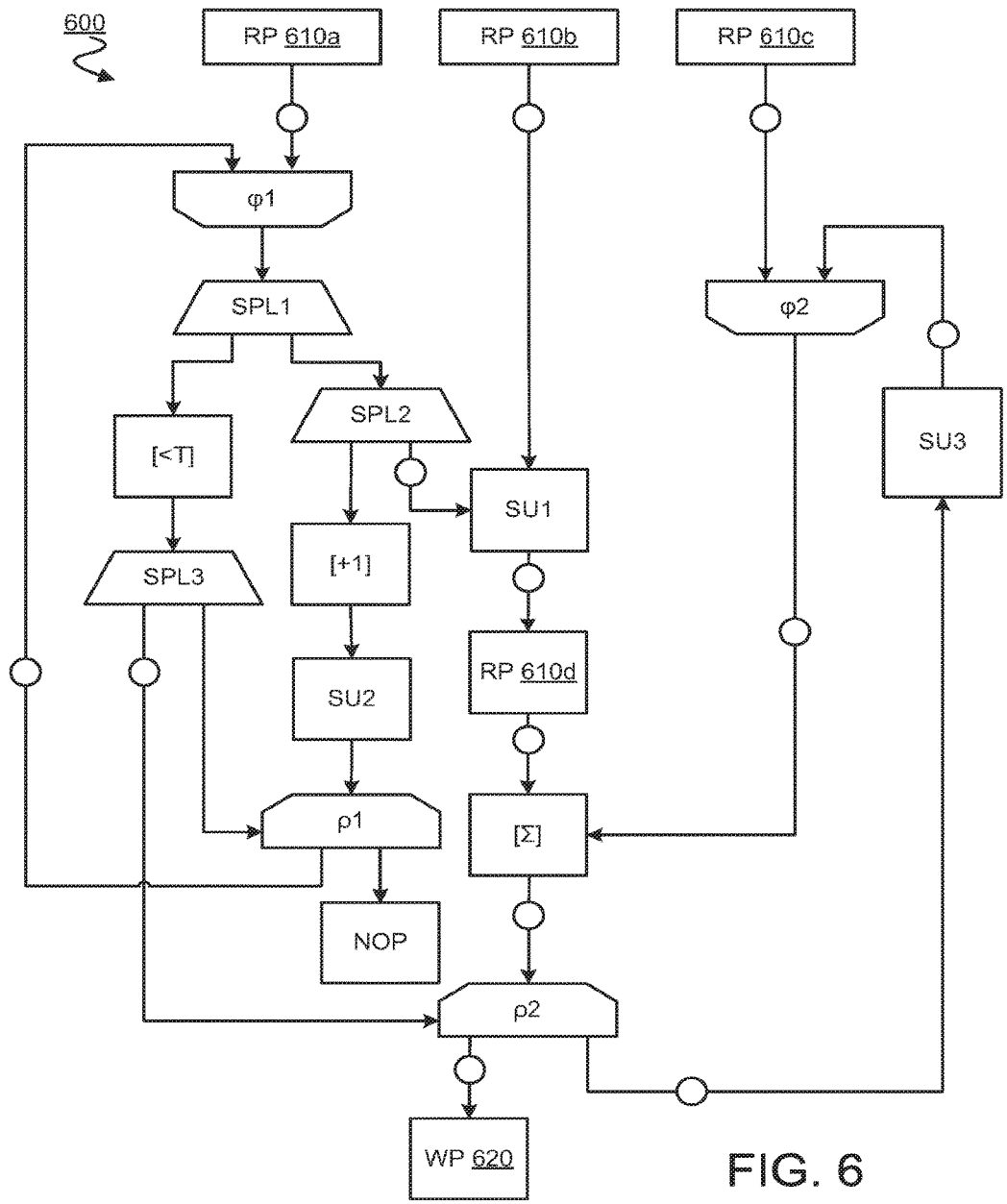
FIG. 6 is a block diagram showing elements of a data path set formed in a data path module according to an embodiment.

FIG. 6 provides a functional representation of elements of a data path module (DPM) 600 during a configuration for executing an instruction according to an embodiment. DPM 600 may, for example, include some or all of the features of DPM 500. As shown in FIG. 6, DPM 600 has a current configuration which has formed an illustrative set of one or more data paths (a "data path set") for execution of some arbitrary instruction to perform multiple atomic data operations. Such a configuration of DPM 600 may, for example, be based upon programming information received from a host processor—e.g. a CPU—of a computer platform which includes DPM 600. Such a configuration may further be based upon a data processing task being assigned to a DSPE which includes DPM 600. In an embodiment, DPM 600 may be reconfigured to replace the current data path set of FIG. 6 with some alternative data path set corresponding to a different multi-operation instruction.

The illustrative data path set of DPM 600 may include at least one read port—e.g. the illustrative read ports 610a, 610b, 610c, 610d—to read input data to be operated on. The read ports may read in operands for one or multiple respective atomic operations—e.g. where input data is read in parallel across multiple read ports and/or in series for one or more particular read ports. In an embodiment, the data path set may further include one or more write ports—e.g. the illustrative write port 620—to write one or more results of the instruction execution to a register file, a private memory, a shared local memory and/or other suitable storage component.

Between read ports and write ports of the data path set, DPM 600 may include any of a variety of combinations of DPUs—e.g. including one or more of a functional unit, a storage unit, an interconnect unit, a branching unit, etc.—to generate the one or more results based on the input data.

For the purpose of illustrating various features of certain embodiments, an arbitrary data path set of DPM 600 is shown. The number and types of DPUs in the data path set, their respective configurations and their various connections to one another are merely illustrative, and are not limiting on certain embodiments. As shown in DPM 600, a data path set may allow for very complex loops and other types of flow control to perform large numbers of atomic operations. Execution of an instruction with the current data path of DPM 600 may be data driven—e.g. where execution is driven independent of any scheduling signal received from a DSPE control unit and/or from a PA mC during the data driven execution.

In the data path set of DPM 600, one or more DPU connections may be switched connections—e.g. as indicated by small circle symbols on the connections between DPUs. Such switched interconnections may be configured, for example, by a programming of a switch module such as switch module 510. Additionally or alternatively, the data path set of DPM 600 may include sets of DPUs which are interconnected permanently. By way of illustration and not limitation, a data path from $\phi$-node $\phi1$ to splitter SLP3 and/or a data path from $\phi$-node $\phi1$ to $\rho$-node $\rho1$ may be hard-wired. Such hardwiring may provide for ready reconfiguration of the DPUs in such data paths—e.g. where some functionality of such paths may be configured, but some overall structure of such paths are expected to be used in many different algorithms of a particular algorithm type.

Figure 7:
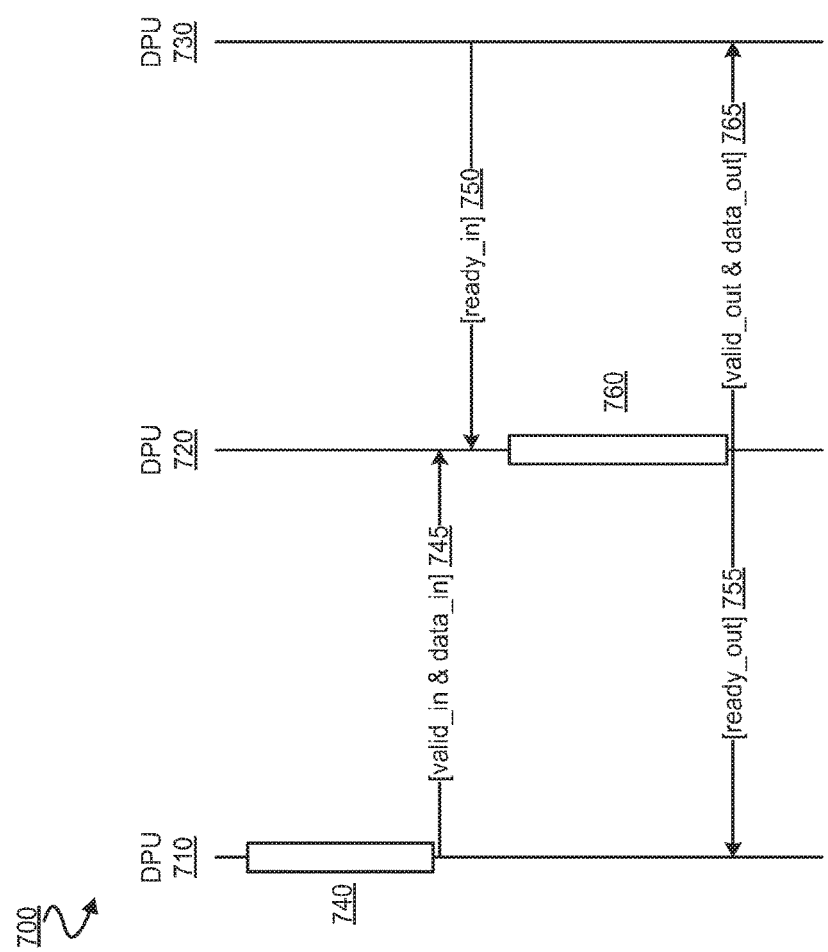
FIG. 7 is a sequence diagram showing elements of a signal exchange for executing a data processing instruction according to an embodiment.

FIG. 7 illustrates elements of a signal exchange 700 between multiple DPUs of a data path set during execution of an instruction according to an embodiment. Signal exchange 700 may, for example, be exchanged during operation of a data path module including some or all of the features of DPM 600.

Signal exchange 700 may include different signals variously communicated between multiple DPUs—e.g a DPU 710, a DPU 720 and a DPU 730. The particular functionality implemented at each of the DPUs is not limiting on certain embodiments. In an embodiment, DPU 710 may perform some first operation 740—e.g. to read, store, calculate, multiplex, demultiplex or otherwise process some input data for generating some output data. DPU 720 may be similarly responsible for performing some operation 760 subsequent to the performance of operation 740 by DPU 710. Similarly, DPU 720 may be responsible for performing some other operation subsequent to the performance of operation 760 by DPU 720.

After completion of operation 740, DPU 710 may send one or more communications 745—e.g. including data sent to a data_in input of DPU 720 and a validity control signal to a valid_in input of DPU 720. Operation 760 may, for example, require the data received via data_in as an operand. In certain embodiments, operation 760 may also be predicated on one or more other data and/or control communications being exchanged by DPU 720. By way of illustration and not limitation, configuration of DPU 720 may require it to first receive a communication 750 via its read_in input—e.g. the communication 750 indicating that DPU 730 is ready to receive any data which might be generated by operation 760.

Upon completion of operation 760, DPU 720 may send one or more communications 765—e.g. including data sent from a data_out output of DPU 720 and a validity control signal from a valid_out output of DPU 720. The configuration of DPU 720 may additionally or alternatively require it to issue one or more control signals in response to completing operation 760. For example, DPU 720 may be configured to send via its read_out output a communication 755 to DPU 710—e.g. the communication 755 indicating that DPU 720 is ready to send the output data generated by operation 760. DPU 710 may be configured to respond to communication 755 by performing one or more actions—e.g. including DPU 710 flushing a locally stored copy of the data which resulted from operation 740.

Signal exchange 700 is one illustrative scenario of how DPUs may be configured, according to different embodiments, to variously exchange one or more readiness signals to regulate execution of an instruction in a data path set. Programming a DPM to form a particular data path set may include configuring DPUs to require any of a variety of readiness control signal exchanges (and/or responses thereto)—e.g. including control signal exchanges such as those in signal exchange 700. Configuring a DPM to implement such readiness control signal exchanges allows for the implementation of "elastic"—i.e. asynchronous and data driven—execution of a multi-operation instruction.

Figure 8:
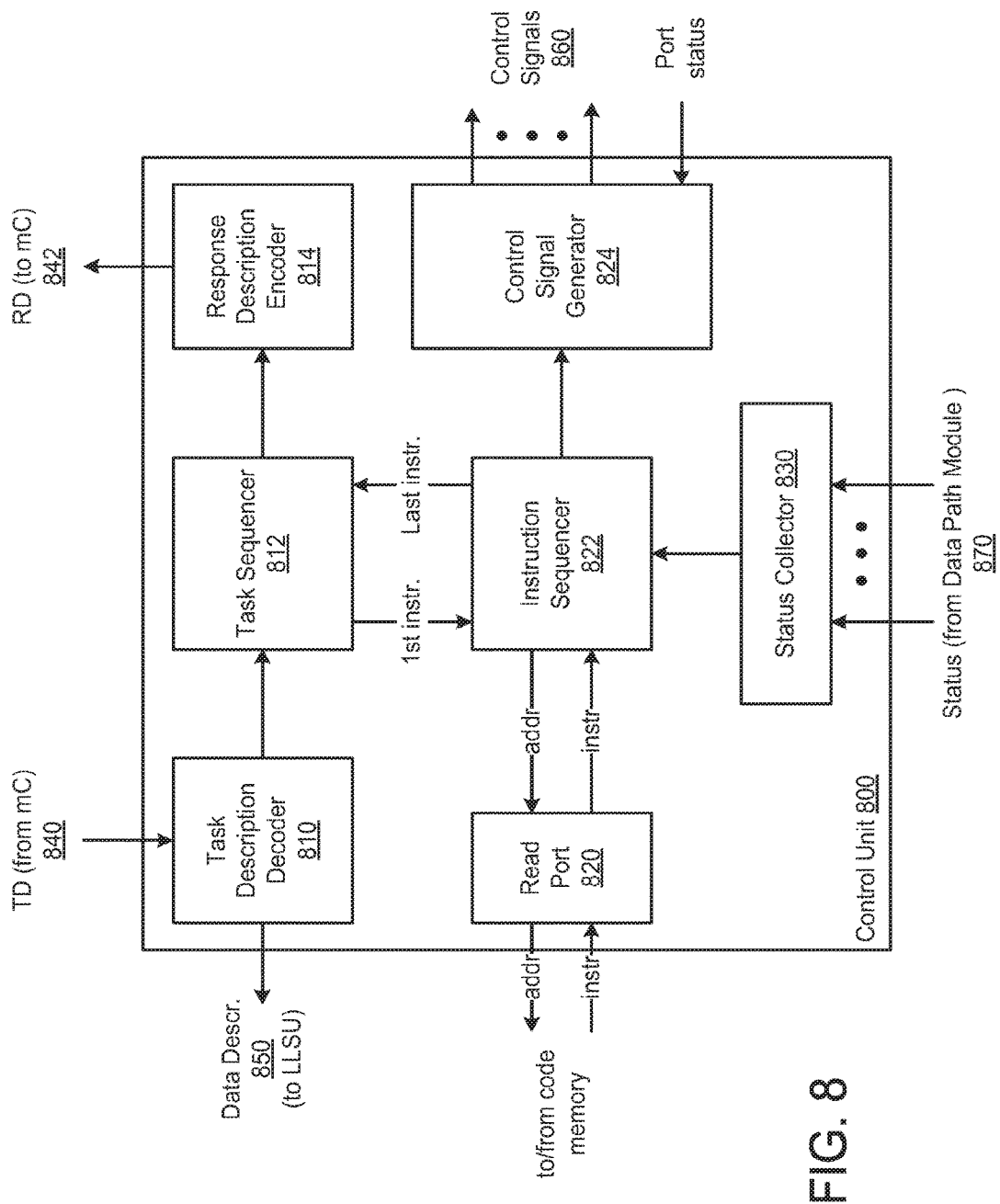
FIG. 8 is a block diagram showing elements of a control unit of a data stream processing engine according to an embodiment.

FIG. 8 illustrates select elements of a control unit (CU) 800 to control execution of an instruction in a data stream processing engine according to an embodiment. CU 800 may include some or all of the features of CU 420, for example.

CU 800 may include a task description decoder 810 to receive a task descriptor 840 which has been provided by a mC of the accelerator in which CU 800 operates. TD 840 may, for example, be automatically detected, read and decoded by task description decoder 810 in response a writing of TD 840 to a register such as task register 414.

CU 800 may further include a task sequencer 812 coupled to receive from task description decoder 810 a communication identifying a task represented by TD 840. In an embodiment, task description decoder 810 may also communicate data descriptor information 850—e.g. to an LLSU of the DSPE—to indicate a need to load data for the task represented by TD 840. Task sequencer 812 may include or otherwise have access to information to determine a first instruction to be performed for the task represented by TD 840. An identifier of the first instruction may then be communicated to an instruction sequencer of 822 of CU 800. For example, instruction sequencer 822 may service what is referred to herein as a DP_Cfg instruction—e.g. issued by the task sequencer 812—the DP_Cfg instruction for performing some configuration of the data path module. A DP_Cfg instruction may take one or more parameters to specify, for example, a number of iterations of the instruction to be executed, a condition for initiating or continuing a data path configuration and/or the like.

In an embodiment, instruction sequencer 822 includes circuit logic to service a DP_Cfg instruction—e.g. by identifying a set of one or more data paths to be formed in a data path module for execution of an instruction of a task sequence. For example, instruction sequencer 822 may communicate via a read port 820 of CU 800 to retrieve from code memory instruction information characterizing the identified first instruction. Such instruction information may, for example, include a bit field, flag field or other data structure including values representing a set of configurations for DPUs of the data path module. Based on the instruction information for the identified first instruction, instruction sequencer 822 may determine a set of DPU configurations corresponding to the instruction, and communicate that set of DPU configurations to a control signal generator 824 of CU 800. Based on the set of DPU configurations from instruction sequencer 822, control signal generator 824 may send a set of control signals 860 to implement such configurations for formation of the data path set. A data driven execution of the first instruction may be performed once the data path set has been configured in the data path module.

During and/or after execution of an instruction, one or more status signals 870 may be sent to a status collector 830 of CU 800 to indicate a state of execution of the data path module. In an embodiment, the one or more status signals 870 includes an "end of instruction" control signal specifying a complete execution of the instruction corresponding to the current data path set of the data path module. In response to such an "end of instruction" control signal, instruction sequencer 822 may determine—e.g. based on communications with task sequencer 812—whether there is any next instruction to be performed in an instruction sequence for the current task.

Instruction sequencer 822 may determine a next instruction to execute in one of at least two different ways, static and dynamic. In a static case, selection of a next instruction does not depend on the current instruction execution. For example, instruction sequencer 822 may calculate the next instruction address according to the following:

$$addr(next)=addr(curr)+length(curr) \quad (1)$$

where addr(next) is the address of the next instruction, addr(curr) is the address of the current instruction and length(curr) is some length associated with the current instruction.

By contrast, the dynamic case may determine a next instruction according to a contingent evaluation such as the following:

$$addr(next)=(\text{'operate'}\Lambda(addr(cur)+length(cur)))V \\ (\text{'except'}Vaddr(alt)) \quad (2)$$

where some alternate address addr(alt) is to be used as addr(next) if execution of the current instruction results in an exception 'except' which is distinguished from some normal 'operate' state of the DPM.

Where some next instruction of the sequence is indicated, instruction sequence 822 may retrieve from code memory instruction information describing, for example, another data path set for execution of that next instruction. Accordingly, instruction sequencer 822 may implement a series of configurations of a data path module, each configuration to form a respective data path set for executing a corresponding instruction of an instruction sequence for performing a task. Such a series of configurations and executions may be performed by CU 800 independent of the mC sending to CU 800 any explicit per-operation or per-instruction communications to schedule, trigger or otherwise specify component operations of such execution.

In an embodiment, instruction sequencer 822 may communicate to task sequencer 812 that a last instruction for the task has been completed. In response, task sequencer 812 may signal a response description encoder 814 of CU 800 to communicate a response descriptor 842 to the mC of the accelerator. Based on response descriptor 842, the mC may perform any of a variety of interrupt handling or other operations to process the response—e.g to process any final result of the executed task.

Figure 9B:
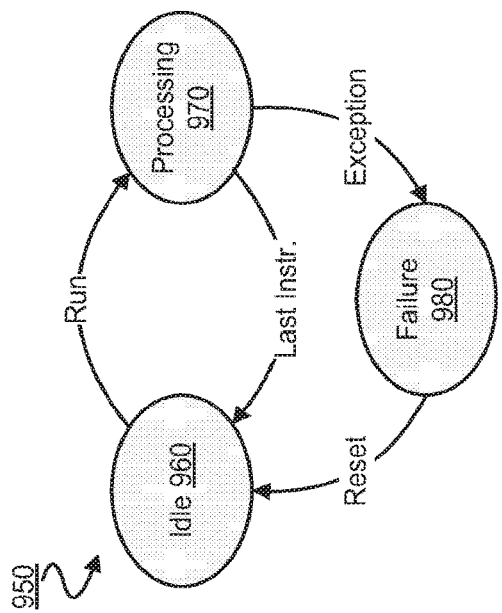
FIG. 9B is a state diagram showing state transitions of a task sequencer of a data stream processing engine according to an embodiment.
Figure 9A:
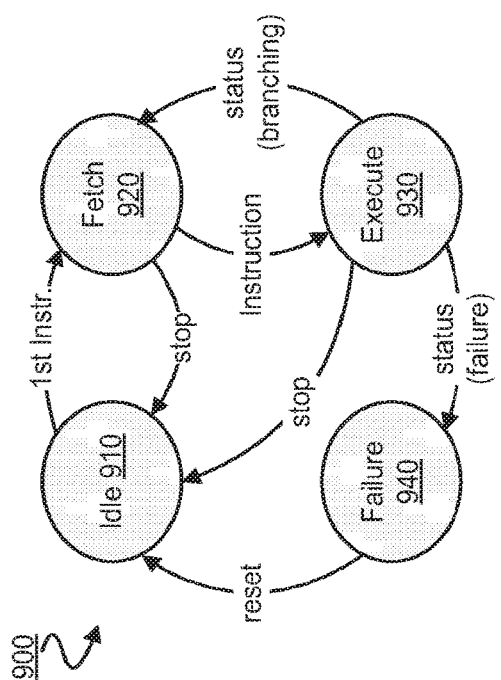
FIG. 9A is a state diagram showing state transitions of an instruction sequencer of a data stream processing engine according to an embodiment.

FIG. 9A illustrates elements of a state diagram 900 for state transitions of an instruction sequencer of a DSPE control unit according to an embodiment. State diagram 900 may represent operation of instruction sequencer 822, for example.

State diagram 900 may include an Idle state 910 during which there is no current instruction to be executed. State diagram 900 may further include a Fetch state 920 during which an instruction is being retrieved for execution. State diagram 900 may further include an Execute state 930 during which an instruction is being executed. State diagram 900 may further include a Failure state 940 during which a failed instruction execution is to be handled.

FIG. 9B illustrates elements of a state diagram 950 for state transitions of a task sequencer of a DSPE control unit according to an embodiment. State diagram 950 may represent operation of task sequencer 812, for example. State diagram 950 may include an Idle state 960 during which there is no current data processing task to be performed—e.g. where the task sequencer is awaiting a TD from an mC.

State diagram 950 may further include a Processing state 970 during which a task is being performed—e.g. where the task sequencer has initiated execution of an instruction sequence corresponding to the task. Receipt and decoding of a task descriptor may result in a transition to Processing state 970. Moreover, successful execution of a last instruction of an instruction sequence may transition the task sequence back to Idle state 960. State diagram 950 may further include a Failure state 980 during which the task sequencer is to recover from some failed execution of one or more instructions for performing the task.

Figure 10:
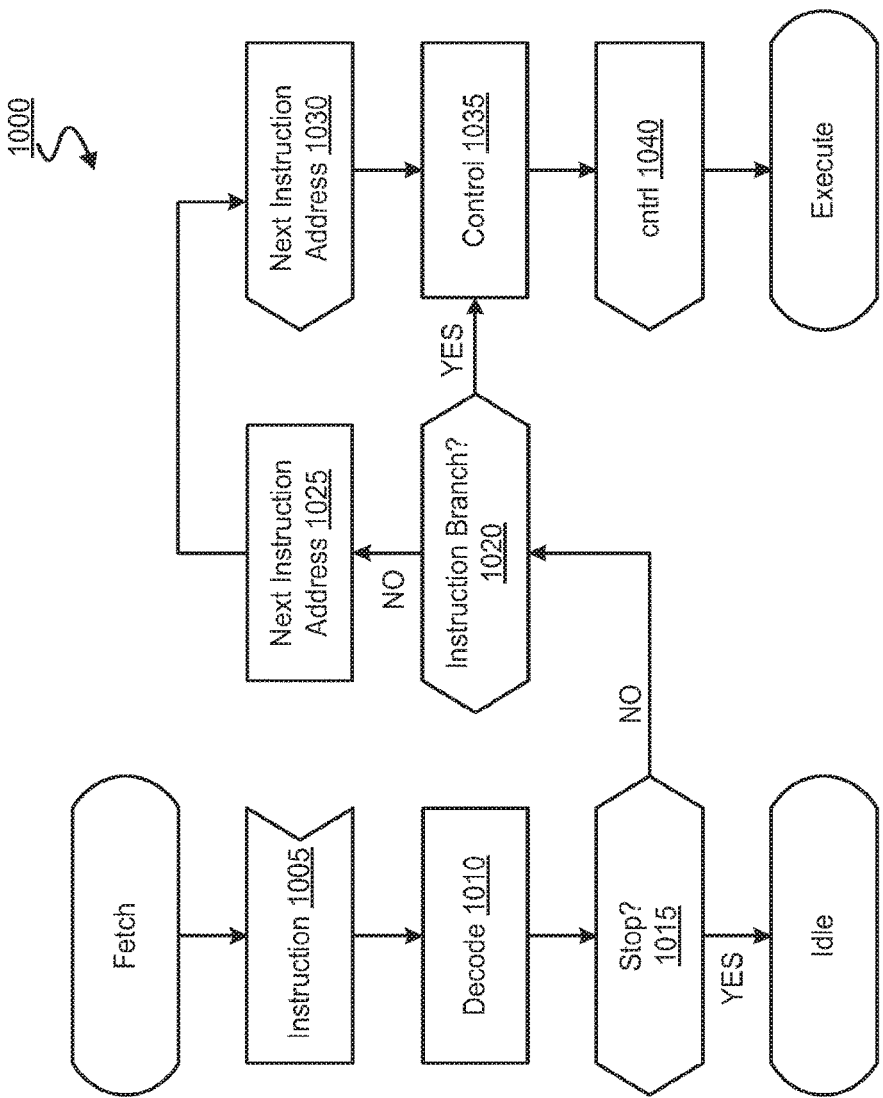
FIG. 10 is a flow diagram showing elements of a state transition for an instruction sequencer of a data stream processing engine according to an embodiment.

FIG. 10 illustrates a sequence diagram 1000 shown various transitions of an instruction sequencer of a DSPE control unit according to an embodiment. Sequence diagram 1000 may, for example, represent some features of state transitions for state diagram 900.

Sequence diagram 1000 shows various paths for transitioning from a Fetch state to either of an Idle state and an Execute state. In an embodiment, an instruction may be received at 1005 and decoded at 1010. After decoding at 1010, a determination may be made at 1015 as to whether implementation of the next instruction is to stop. For example, the determination at 1015 may identify that eventual execution of the next instruction is not needed, is not possible, is to be excepted and/or the like. Where implementation of the next instruction is to be stopped, the instruction sequencer may enter into an Idle state.

However, where implementation of the next instruction is not to be stopped, a determination may be made at 1020 as to whether an instruction branch is necessary—e.g. whether the next instruction to be executed different than an immediately preceding instruction. Where an instruction branch is indicated at 1020, an address of a next instruction may be determined at 1025 and the next instruction sent for at 1030. Where an instruction branch is not indicated at 1020, the address determining at 1025 and instruction retrieving at 1030 may be bypassed. Control information may then be determined at 1035 for the next instruction execution, and one or more control signals may be sent at 1040—e.g. to implement any changes to the configuration of a data path module. After the one or more control signals are sent at 1040, the instruction sequencer may transition to an Execute state.

FIG. 11 illustrates a sequence diagram 1100 showing various transitions of an instruction sequencer of a DSPE control unit according to an embodiment. Sequence diagram 1100 may, for example, represent some features of state transitions for state diagram 900.

Sequence diagram 1100 shows various paths for transitioning from an Execute state back to the Execute state, to a Fetch state or to an Idle state. One path from the Execute state back to the same Execute state may simply include receiving at 1102 a next instruction to execute and storing the instruction at 1104 for later execution.

Another path from the Execution state may include receiving status information at 1006 from execution of a current (or previous) instruction and determining at 1108 whether the status information indicates an exception. Where an exception is indicated at 1108, a determination may be made at 1110 as to whether the exception is for an instruction branching event—e.g. for dynamic evaluation of a next instruction to execute. Where such branching is indicated at 1110, a next instruction address may be determined at 1114 and the next instruction requested 1116. The instruction sequencer may then transition to a Fetch state to await the next instruction. Where instruction branching is not indicated at 1110, the instruction sequencer may initiate some other exception processing at 1112 and transition to a Failure state.

However, where an exception is not indicated at 1108, an evaluation may then be made at 1118 as to whether a next instruction needs to be executed. Any such next instruction may be decoded at 1120 and a determination made at 1122 as to whether implementation of the next instruction should be stopped. Where it is indicated at 1122 that any such next instruction is to be stopped, the instruction sequencer may enter an Idle state. However, where it is not indicated at 1122 that any next instruction is to be stopped, the instruction sequencer may variously transition through one or more of operations 1124, 1126, 1128, 1130 and 1132, which correspond, respectively, to operations 1020, 1025, 1030, 1035 and 1040.

Figures 12A, 12B:
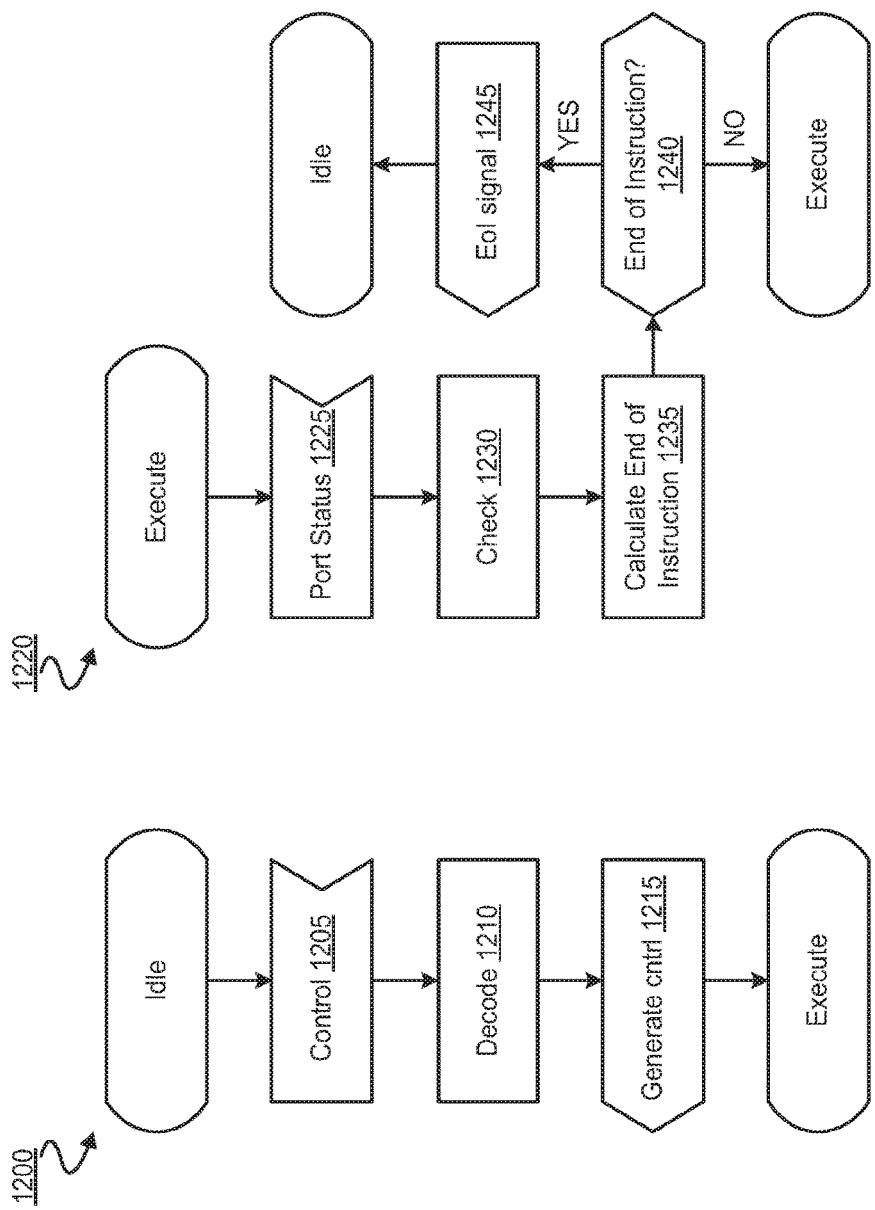
FIG. 12A is a flow diagram showing elements of a state transition for a control signal generator of a data stream processing engine according to an embodiment.
FIG. 12B is a flow diagram showing elements of a state transition for a control signal generator of a data stream processing engine according to an embodiment.

FIG. 12A and FIG. 12B illustrate elements of a sequence diagram 1200 and a sequence diagram 1220, respectively, each of the sequence diagrams 1200, 1220 for state transitions of a control signal generator according to an embodiment. The control signal generator, may for example, be configured for operation in a control unit of a DSPE—e.g. where the control signal generator has some or all of the features of control signal generator 824. In an embodiment, the control signal generator only transitions between two states: an Idle state during which no instruction is being executed, and an Execute during which some instruction is being executed.

In sequence diagram 1200, a transition from Idle state to the Execute may include at 1205 receiving from an instruction sequencer a control signal identifying a data path module configuration to be implemented. The one or more control signals may be decoded at 12010 and a resulting set of multiple control signals sent at 1215 to various DPUs of the data path module. In an embodiment, some or all of the control signals sent at 1215 may be concurrently sent in parallel to respective ones of the DPUs to be configured.

In sequence diagram 1220, a transition of a control signal generator from an Execute state either to the same Execute state of an Idle state may include receiving at 1225 an indication of a port status of the data processing module. The port status information received at 1225 may be checked at 1230 and calculations performed at 1235 to evaluate, for example, a level of memory access activity associated with execution of a current instruction. Based on the calculating at 1235, an evaluation may be made at 1240 to determine whether the end of instruction execution has been reached. If the end of execution has not been reached, the control signal generator may remain in an Execute state. However, where an end of instruction execution is indicated at 1240, an "end of instruction" (EoI) signal may be generated at 1245 and the control signal generator may enter an Idle state. Based on such an EoI instruction, an instruction sequencer may identify a possible need to identify, retrieve and execute some next instruction.

Figure 13:
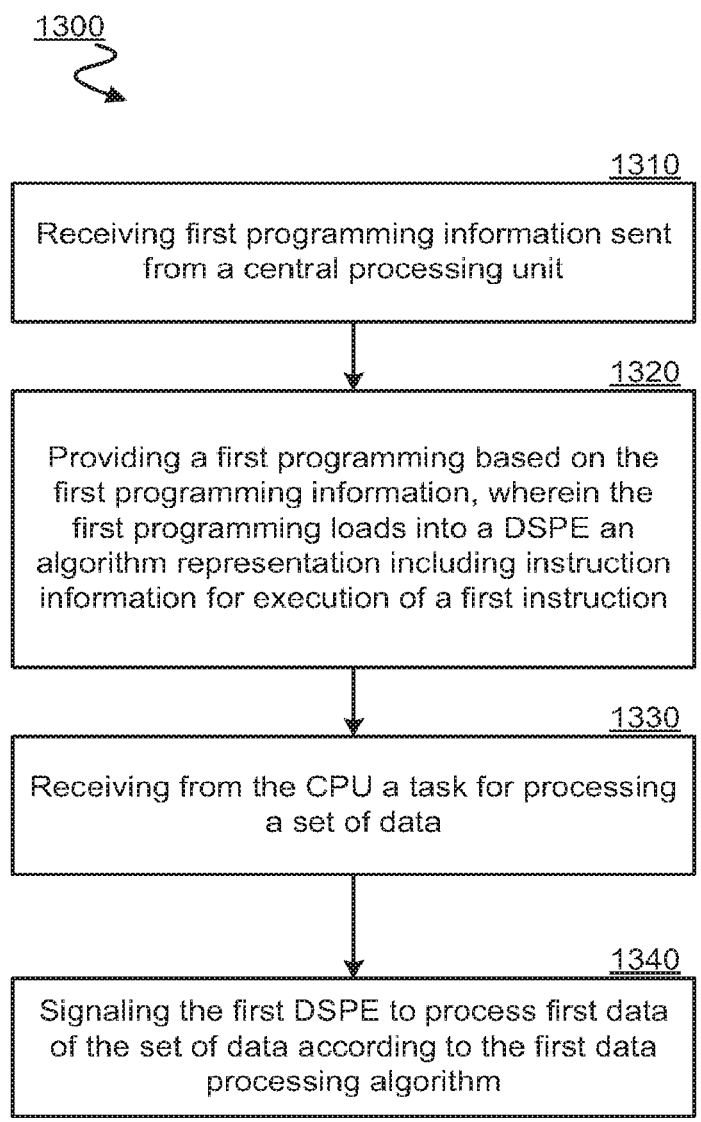
FIG. 13 is a flow diagram showing elements of a method for operating a programmable accelerator according to an embodiment.

FIG. 13 illustrates elements of a method 1300 for operation of a programmable accelerator according to an embodiment. Method 1300 may be performed by an accelerator including some or all of the features of PA 200a and/or PA 200b, for example.

In an embodiment, method 1300 includes, at 1310, receiving programming information—e.g. at an mC of the accelerator. The programming information may, for example be sent from a CPU of a computer platform in which the accelerator operates. Method 1300 may further include, at 1320, providing a programming of the accelerator based on the first programming information.

In an embodiment the programming performed at 1320 may load a representation of a first data processing algorithm into a first data stream processing engine (DSPE) of the accelerator. The first algorithm may be of a particular algorithm type for which the accelerator is specialized in one or more respects—e.g. where the programming replaces a second programming of the accelerator that had previously enabled the accelerator to perform a second data processing algorithm of the algorithm type. The loaded representation may, for example, include instruction information for use in an execution of a particular instruction. Execution of the instruction may include the performance of multiple atomic data operations.

After the providing the first programming, method 1300 may include, at 1330, receiving from the CPU a task for processing a set of data. In response to receiving the task, method 1300 may include, at 1340, signaling the first DSPE to process first data of the set of data according to the first data processing algorithm.

In an embodiment, an LSU of the accelerator is also signaled after the programming—e.g. the signaling for the LSU to exchange the first data from a memory coupled to the accelerator to the first DSPE. The first DSPE may, for example, be triggered to perform data driven execution of the instruction—e.g. in response to the first DSPE detecting that the LSU has completed some storing to make the first data available for processing. In an embodiment the programming of the accelerator at 1320 may include writing configuration information to the LSU. The LSU may exchange the first data according to the configuration information provided—e.g. wherein the LSU reorders or otherwise prepares the first data based on the configuration information.

Figure 14:
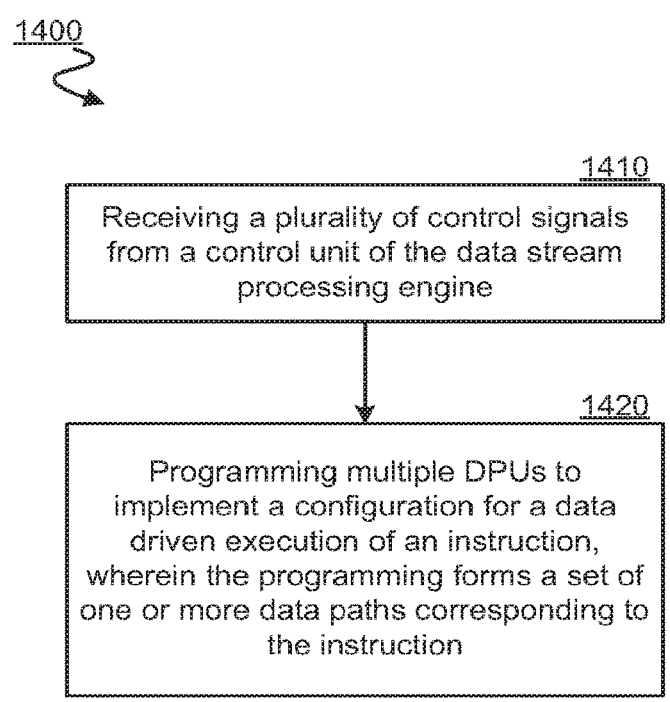
FIG. 14 is a flow diagram showing elements of a method for operating a data path module of a data stream processing engine according to an embodiment.

FIG. 14 illustrates elements of a method 1400 for operating a data path module of a DSPE according to an embodiment. Method 1400 may be performed by a data path module having some or all of the features of DPM 500, for example.

In an embodiment, method 1400 includes, at 1410, receiving a plurality of control signals from a control unit of the DSPE. With the plurality of control signals received at 1410, method 1400 may include, at 1420, programming multiple data processing units (DPUs) of the data path module to implement a configuration for a data driven execution of an instruction. Execution of such an instruction may, for example, perform multiple atomic operations.

In an embodiment, the programming of the multiple DPUs at 1420 may form a set of one or more data paths corresponding to the instruction. For example, the configuration implemented by the programming may include a read port of the data processing module being configured to read into the set of one or more data paths input data for processing by the data driven execution. Additionally or alternatively, the configuration may include a write port of the data processing module being configured to write from the set of one or more data paths a final result of the data driven execution.

Additionally or alternatively, the configuration may include a first DPU of the data processing module being configured to exchange data and/or control communications with some second DPU of the data processing module. For example, the first DPU and second DPU may exchange intermediate data based on the input data, the intermediate data for determining the final result. In an embodiment, the first DPU and second DPU may also be configured to exchange a control signal indicating a readiness of the first DPU to perform an action for determining the final result. For example, the control signal may indicate to the first DPU that the second DPU is ready to receive intermediate data generated by the first DPU performing the atomic operation. Alternatively, the control signal may indicate to the second DPU that the first DPU has performed an operation based on output data from the second DPU—e.g. whereupon the second DPU may subsequently flush a locally stored copy of the output data.

Figure 15:
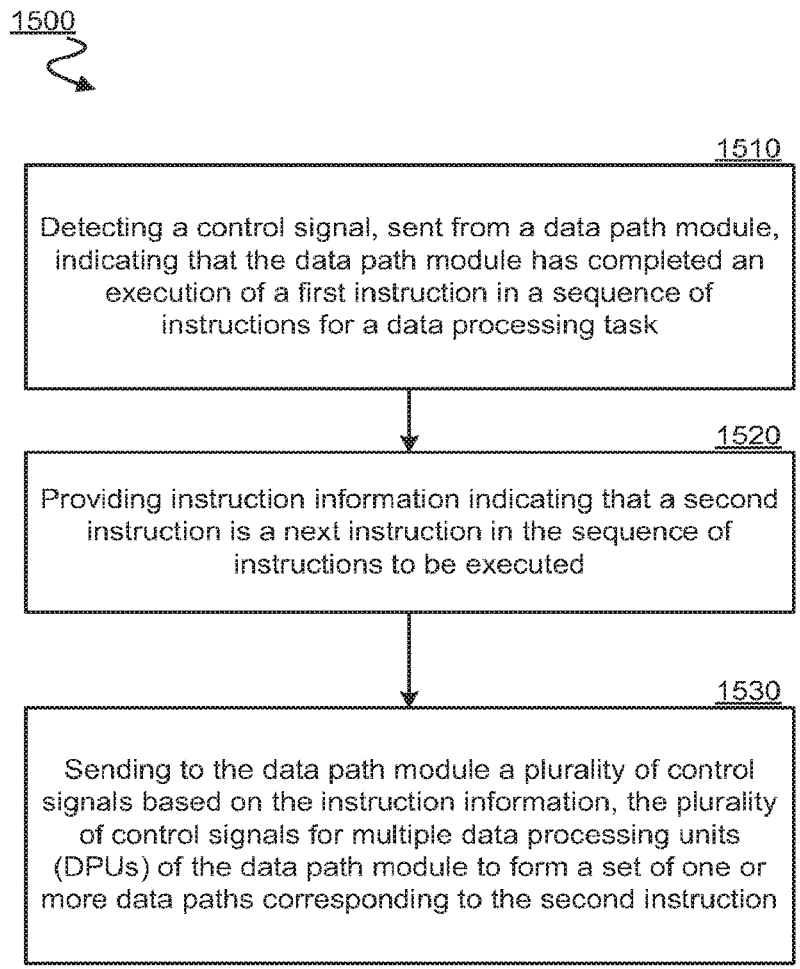
FIG. 15 is a flow diagram showing elements of a method for operating a control unit of a data stream processing engine according to an embodiment.

FIG. 15 illustrates elements of a method 1500 for operating a control unit in a data stream processing engine according to an embodiment. Method 1500 may be performed by a control unit include some or all of the features of control unit 800, for example.

In an embodiment, method 1500 may include, at 1510, detecting a control signal sent to the control unit from a data path module of the DSPE. The control signal may indicate that the data path module has completed an execution of a first instruction—e.g. one of multiple instructions in a sequence of instructions which may be used to perform a data processing task. For example, the control signal may specify a status (such as an Idle state) of a port of the data path module. In an embodiment, the first instruction is for the data path module to perform multiple atomic operations. In response to the first control signal, method 1500 may include, at 1520, providing instruction information indicating that a second instruction is a next instruction in the sequence of instructions to be executed. In an embodiment, the second instruction may also be to perform some multiple atomic operations.

Based on the instruction information, method 1500 may include, at 1530, sending to the data path module a plurality of control signals for multiple data processing units (DPUs) of the data path module to form a set of one or more data paths corresponding to the second instruction. The instruction information may be provided based on a determination that the second instruction is the next instruction in the sequence of instructions to be executed. Such a determination may be made, for example, based on one or more status signals generated as a result of execution of the first instruction. The plurality of control signals may, for example, be based on a bit field or other suitable data structure corresponding to the second instruction—e.g. where each bit in the bit field represents a configuration of a respective DPU of the multiple DPUs. In an embodiment, sending the plurality of control signals includes sending signals in parallel to different respective ones of the multiple DPUs.

Figure 16:
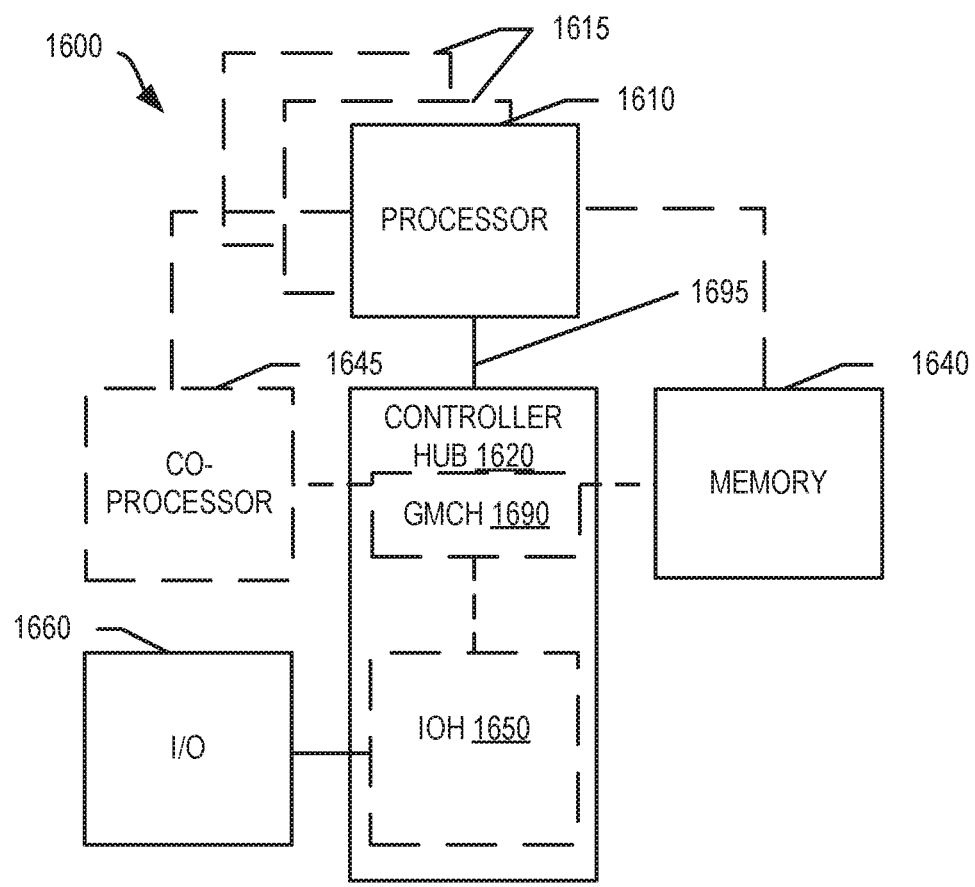
FIG. 16 is a block diagram showing elements of a computer system for performing a data processing task according to an embodiment.
Figure 17:
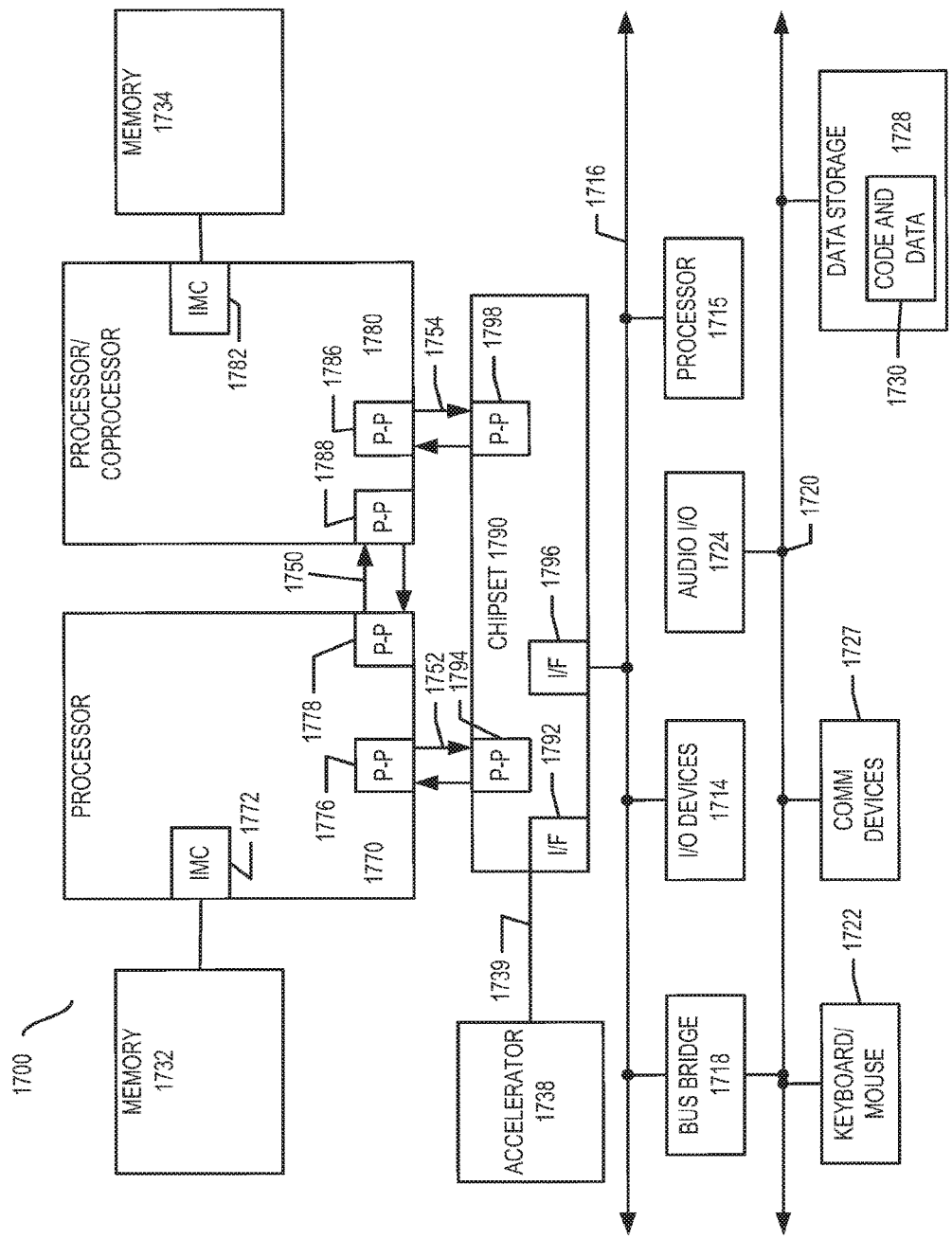
FIG. 17 is a block diagram showing elements of a computer system for performing a data processing task according to an embodiment.
Figure 18:
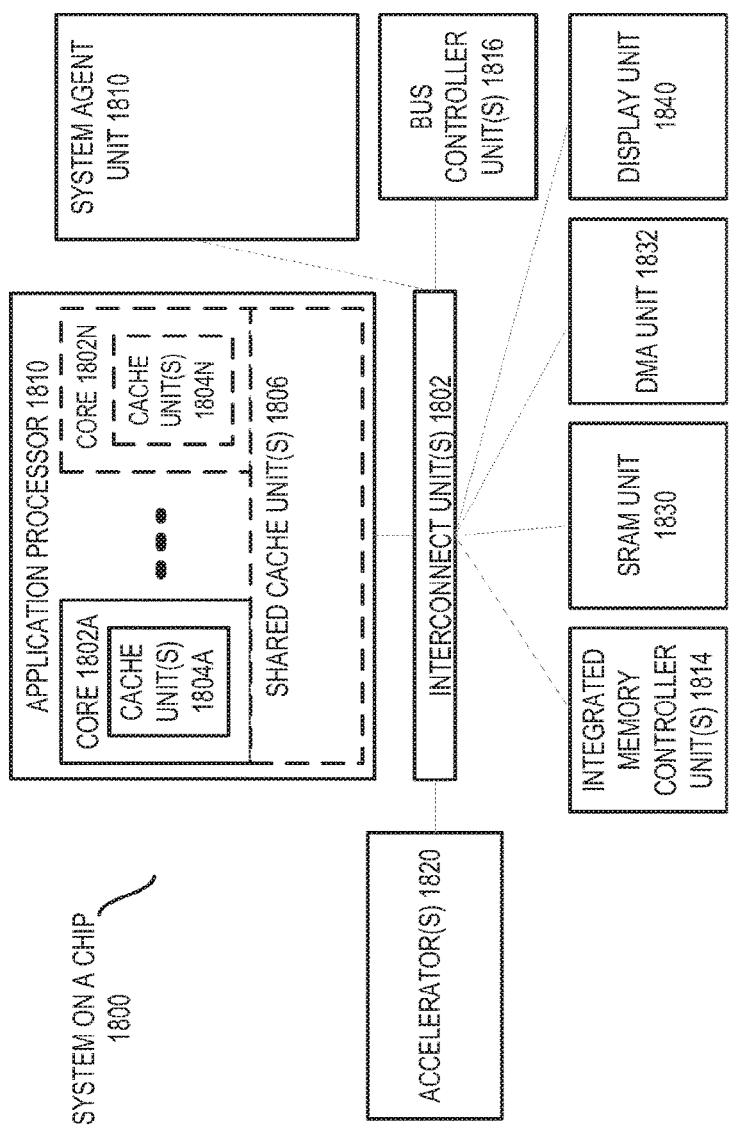
FIG. 18 is a block diagram showing elements of a computer system for performing a data processing task according to an embodiment.

FIGS. 16-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 16, shown is a block diagram of a system 1600 in accordance with one embodiment. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a programmable accelerator 1645; the IOH 1650 couples input/output (I/O) devices 1660 to the GMCH 1690. Alternatively, one or both of the memory and graphics controllers are integrated within the processor (as described herein), the memory 1640 and the programmable accelerator 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor QAG00.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the programmable accelerator 1645 is a special-purpose data processing device as described herein. In one embodiment, controller hub 1620 may include an integrated graphics (or other) accelerator having some or all of the programmable functionality described herein.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be accelerator instructions. The processor 1610 recognizes these accelerator instructions as being of a type that should be executed by the attached programmable accelerator 1645. Accordingly, the processor 1610 issues these accelerator instructions (or control signals representing accelerator instructions) on an accelerator bus or other interconnect, to programmable accelerator 1645. Accelerator(s) 1645 accept and execute the received accelerator instructions.

Referring now to FIG. 17, shown is a block diagram of a first more specific exemplary system 1700 in accordance with an embodiment. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor QAG00. In one embodiment, processors 1770 and 1780 are respectively processors 1610 and 1615, while accelerator 1738 is programmable accelerator 1645. In another embodiment, processors 1770 and 1780 are respectively processor 1610 and programmable accelerator 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may exchange information with the programmable accelerator 1738 via a high-performance interface 1739. In one embodiment, the programmable accelerator 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of certain embodiments are not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Referring now to FIG. 18, shown is a block diagram of a SoC 1800 in accordance with an embodiment. Similar elements in Figure QAG bear like reference numerals. Also, dashed lined boxes are optional features on more advanced SoCs. In FIG. 18, an interconnect unit(s) 1802 is coupled to: an application processor 1810 which includes a set of one or more cores 202A-N and shared cache unit(s) QAG06; a system agent unit QAG10; a bus controller unit(s) QAG16; an integrated memory controller unit(s) QAG14; a set or one or more programmable accelerators 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the accelerator(s) 1820 include a special-purpose processor, such as, for example, a network or communication processor, compression engine, GPGPU, a high-throughput MIC processor, embedded processor, or the like.

Techniques and architectures for executing a data processing instruction are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus for operation in a computer platform, the apparatus comprising:
a programmable accelerator (PA) including:
a microcontroller (mC) to receive first programming information sent from a central processing unit (CPU) of the computer platform to the PA, the mC to provide a first programming of the PA based on the first programming information, wherein, after the first programming, the PA to receive from the CPU a task for processing a set of data;
a first data stream processing engine (DSPE) coupled to the mC, wherein the first programming loads a representation of a first data processing algorithm into the first DSPE, the representation including first instruction information for execution of a first instruction to perform multiple atomic operations, wherein the mC further to signal the first DSPE to process first data of the set of data according to the first data processing algorithm; and
a load store unit (LSU) coupled to the mC and the first DSPE,
wherein, after providing the first programming of the PA, the mC further to signal the LSU to exchange the first data from a memory coupled to the PA to the first DSPE; wherein the first programming writes configuration information to the LSU, and wherein the LSU to exchange the first data according to the configuration information, and wherein the LSU to exchange the first data according to the configuration information includes the LSU to reorder the first data according to the configuration information.

2. The apparatus of claim 1, wherein the DSPE to processing of the first data, including:
the DSPE to detect a storing of the first data performed with the LSU, wherein detected storing of the first data triggers the DSPE to begin an execution of the first instruction.

3. The apparatus of claim 1, further comprising:
a second DSPE coupled to the mC, wherein the mC further to signal the second DSPE to process second data of the set of data according to the first data processing algorithm; and
a local memory coupled between the LSU, the first DSPE and the second DSPE, wherein the LSU to provide the first data to the first DSPE via the local memory and to provide the second data to the second DSPE via the local memory.

4. The apparatus of claim 3, wherein the first DSPE and the second DSPE are heterogeneous with respect to one another.

5. The apparatus of claim 1, wherein the first algorithm is of an algorithm type and wherein the first programming replaces a second programming of the PA which enables the PA to perform a second data processing algorithm of the algorithm type.

6. The apparatus of claim 1, wherein the first algorithm is of an algorithm type and wherein at least part of the first DSPE includes an architecture specific to the algorithm type.

7. The apparatus of claim 1, wherein representation of the first data processing algorithm further includes sequence information for executing a sequence of instructions including the first instruction.

8. A method at an accelerator in a computer platform, the method comprising:
receiving first programming information sent from a central processing unit (CPU) of the computer platform to the accelerator;
providing a first programming of the accelerator based on the first programming information, wherein the first programming loads a representation of a first data processing algorithm into a first data stream processing engine (DSPE) of the accelerator, the representation including first instruction information for execution of a first instruction to perform multiple atomic operations;
after the providing the first programming:
receiving from the CPU a task for processing a set of data,
signaling the first DSPE to process first data of the set of data according to the first data processing algorithm,
signaling a load store unit (LSU) of the accelerator to exchange the first data from a memory coupled to the accelerator to the first DSPE, and
exchanging the first data with the LSU according to the configuration information, wherein exchanging the first data with the LSU according to the configuration information includes the LSU reordering the first data based on the configuration information.

9. The method of claim 8, further comprising processing of the first data, including the DSPE detecting a storing of the first data performed with the LSU, wherein the detecting the storing of the first data triggers the DSPE to begin an execution of the first instruction.

10. The method of claim 8, further comprising:
signaling a second DSPE of the accelerator to process second data of the set of data according to the first data processing algorithm;
exchanging the first data from the LSU to the first DSPE via a local memory of the accelerator; and
exchanging the second data from the LSU to the second DSPE via the local memory.

11. The method of claim 10, wherein the first DSPE and the second DSPE are heterogeneous with respect to one another.

12. The method of claim 8, wherein the first algorithm is of an algorithm type and wherein the first programming replaces a second programming of the accelerator which enables the accelerator to perform a second data processing algorithm of the algorithm type.

13. The method of claim 8, wherein the first algorithm is of an algorithm type and wherein at least part of the first DSPE includes an architecture specific to the algorithm type.

14. The method of claim 8, wherein representation of the first data processing algorithm further includes sequence information for executing a sequence of instructions including the first instruction.

15. A computer platform comprising:
a processor;
a programmable accelerator (PA) coupled to the processor, the PA including:
a microcontroller (mC) to receive first programming information sent from the processor to the PA, the mC to provide a first programming of the PA based on the first programming information, wherein, after the first programming, the PA to receive from the CPU a task for processing a set of data; and a first data stream processing engine (DSPE) coupled to the mC, wherein the first programming loads a representation of a first data processing algorithm into the first DSPE, the representation including first instruction information for execution of a first instruction to perform multiple atomic operations, wherein the mC further to signal the first DSPE to process first data of the set of data according to the first data processing algorithm;

a load store unit (LSU) coupled to the mC and the first DSPE, wherein, after providing the first programming of the PA, the mC further to signal the LSU to exchange the first data from a memory coupled to the PA to the first DSPE; wherein the first programming writes configuration information to the LSU, and wherein the LSU to exchange the first data according to the configuration information, and wherein the LSU to exchange the first data according to the configuration information includes the LSU to reorder the first data according to the configuration information; and a network interface coupled to the processor, the network interface to couple the computer platform to a network.

16. The computer platform of claim 15, wherein the DSPE to processing of the first data, including:

the DSPE to detect a storing of the first data performed with the LSU, wherein detected storing of the first data triggers the DSPE to begin an execution of the first instruction.

17. The computer platform of claim 15, further comprising:

a second DSPE coupled to the mC, wherein the first DSPE and the second DSPE are heterogeneous with respect to one another, wherein the mC further to signal the second DSPE to process second data of the set of data according to the first data processing algorithm; and a local memory coupled between the LSU, the first DSPE and the second DSPE, wherein the LSU to provide the first data to the first DSPE via the local memory and to provide the second data to the second DSPE via the local memory.

* * * * *